US007571458B1

(12) United States Patent
Eyal

(10) Patent No.: US 7,571,458 B1
(45) Date of Patent: Aug. 4, 2009

(54) METHOD AND APPARATUS FOR SELECTING AND DISPLAYING MULTI-MEDIA MESSAGES

(75) Inventor: Bartfeld Eyal, Mazkeret Batia (IL)

(73) Assignee: Integra5 Communications, Inc., Woburn, MA (US)

( * ) Notice: Subject to any disclaimer, the term of this patent is extended or adjusted under 35 U.S.C. 154(b) by 0 days.

(21) Appl. No.: 09/484,730

(22) Filed: Jan. 18, 2000

Related U.S. Application Data

(60) Provisional application No. 60/116,395, filed on Jan. 19, 1999.

(30) Foreign Application Priority Data

Apr. 13, 1999 (IL) .................................... 129412

(51) Int. Cl.
H04M 1/64 (2006.01)
H04M 11/00 (2006.01)
G06F 15/167 (2006.01)
H04N 7/173 (2006.01)

(52) U.S. Cl. .................. 725/137; 725/30; 348/468; 379/88.23; 379/88.25; 379/93.24; 379/93.25

(58) Field of Classification Search ........... 725/87–150, 725/30, 136, 137, 133, 141, 153; 348/473–552, 348/468; 379/88.13, 88.17, 88.22, 88.23, 379/88.25, 93.24, 93.25; 704/235
See application file for complete search history.

(56) References Cited

U.S. PATENT DOCUMENTS

| 4,150,254 | A | * | 4/1979 | Schussler et al. ......... 379/93.25 |
| 4,450,477 | A | * | 5/1984 | Lovett ......................... 725/93 |
| 4,761,684 | A | | 8/1988 | Clark et al. |
| 4,862,268 | A | * | 8/1989 | Campbell et al. ........... 348/463 |
| 5,046,079 | A | | 9/1991 | Hashimoto |
| 5,089,885 | A | | 2/1992 | Clark |
| 5,138,649 | A | * | 8/1992 | Krisberg et al. ............... 379/56 |
| 5,189,691 | A | | 2/1993 | Dunlap |
| 5,317,628 | A | | 5/1994 | Misholi et al. |
| 5,345,258 | A | | 9/1994 | Matsubara et al. |

(Continued)

FOREIGN PATENT DOCUMENTS

EP 0664637 7/1995

(Continued)

OTHER PUBLICATIONS (Computer Dictionary; 1997; Microsoft Press; 3rd Edition; p. 430).*

(Continued)

Primary Examiner—Christopher Kelley
Assistant Examiner—Reuben M Brown
(74) Attorney, Agent, or Firm—Sonia K. Guterman; Lawson & Weitzen, LLP

(57) ABSTRACT

Apparatus and method for remote viewing of selected messages at a subscriber remote receiving location, the apparatus including at least one messaging server (such as, but not limited to, a unified messaging system, voice-mail system, fax server system, or any other message store and management system) and a television set as an output device for messages stored or displayed by the messaging server, and a television messaging gateway coupling the messaging server to the television set.

34 Claims, 20 Drawing Sheets

U.S. PATENT DOCUMENTS

| | | | |
|---|---|---|---|
| 5,371,532 A * | 12/1994 | Gelman et al. | 725/88 |
| 5,414,773 A * | 5/1995 | Handelman | 380/49 |
| 5,479,498 A | 12/1995 | Brandman et al. | |
| 5,483,580 A | 1/1996 | Brandman et al. | |
| 5,497,186 A | 3/1996 | Kawasaki | |
| 5,497,373 A | 3/1996 | Hulen et al. | |
| 5,517,652 A * | 5/1996 | Miyamoto et al. | 725/115 |
| 5,530,740 A * | 6/1996 | Irribarren et al. | 379/89 |
| 5,548,635 A * | 8/1996 | Bradley et al. | 379/102.03 |
| 5,568,540 A | 10/1996 | Greco et al. | |
| 5,581,604 A | 12/1996 | Robinson et al. | |
| 5,631,904 A * | 5/1997 | Fitser et al. | 370/261 |
| 5,721,827 A * | 2/1998 | Logan et al. | 709/217 |
| 5,761,197 A | 6/1998 | Takefman et al. | |
| 5,761,602 A * | 6/1998 | Wagner et al. | 725/34 |
| 5,825,407 A * | 10/1998 | Cowe et al. | 725/130 |
| 5,828,370 A * | 10/1998 | Moeller et al. | 345/328 |
| 5,844,552 A | 12/1998 | Gaughan et al. | |
| 5,859,898 A * | 1/1999 | Checco | 379/88.01 |
| 5,961,603 A | 10/1999 | Kunkel et al. | |
| 5,999,970 A * | 12/1999 | Krisbergh et al. | 709/217 |
| 6,002,394 A * | 12/1999 | Schein et al. | 345/327 |
| 6,014,689 A * | 1/2000 | Budge | 709/206 |
| 6,021,324 A | 2/2000 | Sizer et al. | 455/403 |
| 6,064,440 A * | 5/2000 | Born et al. | 348/478 |
| 6,212,550 B1 * | 4/2001 | Segur | 709/206 |
| 6,252,588 B1 * | 6/2001 | Dawson | 345/329 |
| 6,333,919 B2 * | 12/2001 | Gaffney | 370/254 |
| 6,335,736 B1 * | 1/2002 | Wagner et al. | 715/716 |
| 6,374,215 B1 * | 4/2002 | Chan et al. | 704/235 |
| 6,385,305 B1 * | 5/2002 | Gerszberg et al. | 379/88.13 |
| 6,460,075 B2 * | 10/2002 | Krueger et al. | 709/206 |
| 2002/0026496 A1 * | 2/2002 | Boyer et al. | 709/218 |

FOREIGN PATENT DOCUMENTS

| | | |
|---|---|---|
| EP | 07938387 A2 * | 3/1997 |
| EP | 0793387 | 9/1997 |
| EP | 0818925 | 1/1998 |
| EP | 0822711 | 2/1998 |
| GB | 2329309 | 3/1999 |
| JP | 10-164121 | 6/1998 |
| JP | 10-228430 | 8/1998 |
| JP | 10-232845 | 9/1998 |
| JP | 10-289205 | 10/1998 |
| JP | 11-328056 | 11/1999 |
| WO | WO 9712486 | 4/1997 |
| WO | WO 9856188 | 12/1998 |
| WO | WO 9914953 | 3/1999 |
| WO | WO 01/48986 A1 | 7/2001 |
| WO | WO 01/49032 A1 | 7/2001 |

OTHER PUBLICATIONS (Computer Dictionary; 1997; Microsoft Press; $3^{rd}$ Edition; pp. 173-174).*

International Search Report (IDS) in corresponding PCT application PCT/IL00/00030, issued Jun. 5, 2000.

* cited by examiner

METHOD AND APPARATUS FOR SELECTING AND DISPLAYING MULTI-MEDIA MESSAGES

This application claims the benefit of U.S. provisional application No. 60/116,395, filed Jan. 19, 1999 and Israeli patent application no. 129412 filed Apr. 13, 1999.

FIELD OF THE INVENTION

The present invention relates generally to a method and apparatus of displaying and controlling subscriber selected messages and other related information using a television set or a video monitor. More particularly, the present invention relates to a method including a computer that generates a video information that is sent, using a cable-TV or other broadcasting network or networks, to be displayed on a subscriber's TV screen. The method further includes an input device or input method, which may be a telephone, or a touch-tone keypad, or a speech recognition method using a telephone, or a remote control unit or a keyboard.

BACKGROUND OF THE INVENTION

There presently are systems that allow a subscriber to view selected video information on television. These methods relate to a pre-existing video information or video streams, such as video players reproducing a video movie or program. There are also methods for allowing a subscriber to select to see such video streams using a telephone, for example for pay-per-view applications. (U.S. Pat. No. 4,761,684 to Clark, et al).

Other applications using a TV screen display for sending textual messages to the subscriber's TV screens are also known (U.S. Pat. No. 5,497,186 to Kawasaki). This patent presents a central facility that transmits, together with a television signal, a message directed to a particular TV set. This message is textual only.

In another invention, (U.S. Pat. No. 5,089,885 to Clark, et al) a central processor sends a display of a menu to the subscriber's television, and the subscriber then selects, using a telephone keypad, a video source to watch. The video source is a pre-recorded video, such as a movie or a program, and is not generated by the processor of the system. The video display from which the subscriber selects a code is a list of all available video sources. This invention is a way of performing a pay-per-view application, and is not an interaction with an information store in which the video screen is dynamically generated as a function of the messages that exist for the used in information store or information stores.

These inventions basically include a table of codes, which is displayed on the TV screen. Upon pressing a certain code on the telephone keypad, instructions are transmitted via the telephony system to the TV broadcaster, who broadcasts a selected video to the TV screen.

Voice, fax, and e-mail messaging systems are examples for messaging systems in general that allow people to leave messages for other subscribers on the system (that subscriber is also called mailbox owner, or just subscriber throughout this document). The most familiar messaging system is a voice-mail system, where a caller can leave a recorded voice message to the called party, if the called party did not answer the call or the line was busy.

Another known messaging system is electronic mail, or e-mail. Fax is another known means of communication. Many telephone system operators offer some kind of messaging to its subscribers, and most telephone and cellular telephone operators offer voice-mail systems.

Unified messaging systems are also known. These systems combine all types of messages and make them appear as "unified" from the standpoint of the user. For example, when a user accesses the unified messaging system using a telephone, the unified messaging tells him/her about all types of messages, including but not limited to voice-mail messages faxes and e-mail messages. Such systems are offered by Lucent-Octel messaging division (USA), Active-Voice (Seattle, USA), AVT (Seattle USA), and Comverse, N.J. USA, for example.

Unified messaging systems are usually connected to a PBX (Private Branch Exchange) and also to the LAN (Local Area Network), and provide their user with a graphical user interface that runs on his/her PC (personal computer), in addition to the telephone user interface. See for example U.S. Pat. No. 5,568,540. Unified messaging systems that are used by service-providers (such as GTE, USA or JFAX, USA) are connected both to the telephone switch and to the Internet, and provide the user also with a graphical user interface that is accessed from his web-browser program or other Internet-based applications.

None of these systems allow a subscriber to have, on his or her TV, a display containing a list of all messages that originally arrived from the telephony or the e-mail network and were sent to him (such as voice-mail message, fax, video messages) and then to selectively select from the messages list a message, and to play or view this or these messages either using the TV capabilities, or set-top box capabilities, or a telephone capabilities, and have additional control over one or more of these messages, such as delete it or reply to it.

SUMMARY OF THE INVENTION

In these specifications, including the claims, the term 'video signals' relates to signals containing audio, as well as visual data, and alternatively also data signals such as commonly inserted in television synchronization intervals or data transmitted in any convenient form, where the data content instructs a set-top box to generate a video display. The video signals may be of analog or digital nature. Similarly, the terms video messages, and audio visual messages are used interchangeably in the specifications, accept when the nature of the discussion differentiate therebetween and displaying of such messages includes audio reproductions, according to the nature of the message. The terms user and subscriber are also used interchangeably throughout, as are the terms 'television messaging gateway', 'TV messaging gateway' and the equivalent acronym 'TVMG'.

The basic aim behind the invention is to allow a user access to media-rich messages via a television without the user needing a home computer to do so. The invention utilizes the television screen as a medium to handle and view such messages. The invention also provides for accepting and delivering outgoing messages from the user, for example by using speech. The invention allows processing of voice, fax, and media-rich e-mail and provides access to them through a TV and any convenient user input mechanism.

The present invention provides an apparatus for remote viewing of selected messages on a television at a subscriber receiving location in an environment that includes at least one messaging server (such as, but not limited to, a unified messaging system, voice-mail system, fax server system, or any other message store and management system) and a television set as an output device for messages stored or displayed by the messaging server. A television messaging gateway couples the messaging server to the television set using a message control interface and logic to direct messages and convert them to a format suitable for TV display (For example by using a video output module.). The television messaging gateway can be of a centralized type (a single TVMG that serves plurality of users), a local type (where the TVMG is implemented within the user premises, e.g. as software residing in the set-top box connected to the subscriber television) or of a distributed type (where some of the television messaging gateway modules are implemented at the subscriber premises, and the remaining modules are implemented centrally) According to a preferred embodiment, the apparatus further includes an input device for inputting subscriber commands to the television messaging gateway. The input device may be a telephone touch-tone key-pad, telephone microphone, using speech-recognition technology, a keyboard linked to a set-top box, a microphone that is built into a remote-control unit, or otherwise coupled into a set-top box, a pointing device, or other remote control unit linked to the set-top box; all depending on the availability of these devices at the subscriber's premises.

Thus, it is a particular feature of the present invention that the television becomes an interactive messaging center, whereby pressing buttons on the telephone keypad for example, causes the graphical display containing a list of messages, or a particular message, viewed on the TV screen to change.

The messaging server is coupled directly or indirectly to any downstream network for distributing messages. The specific embodiments of a downstream network are a matter of availability, cost and technical choice, and those choices include (but are not limited to) cable-TV, satellite, terrestrial, xDSL, wireless, coaxial cable, Ethernet network, cellular network, and others. However, for this invention, the primary characteristic of the downstream network is its functionality of delivering the message from the messaging server to the television messaging gateway and to the display device.

According to a preferred embodiment of the invention, the television messaging gateway includes a CPU and memory module, a communication card, such as LAN, an input device interface, and a video output module.

Further according to a preferred embodiment of the invention, the television messaging gateway includes means for providing message notification to the subscriber's television set.

The present invention also provides a method for viewing selected messages at a subscriber receiving location including coupling a television messaging gateway to a television set, coupling at least one messaging server to the television messaging gateway, and causing the television messaging gateway to provide messages received in the messaging server to The television set for audio-visual display thereon.

According to a preferred embodiment of the invention, the step of causing includes inputting subscriber commands to the gateway.

The present invention is designed to operate primarily in a television broadcast system having a central location with at least one video source connected to a downstream network constructed to carry video signals and selectively distribute the video signals to a plurality of addressable remote terminals connected thereto. Each remote terminal is constructed to selectively receive and display the video signal on a television screen. The invention operates in conjunction with a messaging server constructed to store and forward messages, and an upstream network capable of delivering user input signals from a remote location to the central location.

The television messaging gateway has a message control interface coupled to the messaging server for controlling at least one message therein, the message having address information associated therewith, to associate the message with at least one user. A video output module coupled to the downstream network, generates video signals corresponding to the message, to be fed into the downstream network for display on a television set coupled to the addressable terminal. The television messaging gateway also includes logic to direct the message between the message control interface and the video output module. In an embodiment in which the television messaging gateway is implemented wholly or partially in the set-top box, or otherwise within the customer premises, the downstream network also includes the video, radio frequency, or digital information path between the local portion of the television messaging server such as the set-top box, and the television.

The television messaging gateway may further include an input device interface connected to the upstream network for receiving user input signals. The logic is constructed to interactively respond to the user input signals, and selectively direct messages to an addressable terminal associated with a user. The logic is further constructed to display a list of messages available for a specific user, to enable the user to select at least one message of the list for display. A user interface module, responsive to user input signals and constructed to cause generation of video signals to display data corresponding to the type and number of messages directed to a user, and to facilitate user selection of messages to be directed to the addressable terminal. In a preferred embodiment the input device interface comprises a telephony interface, and the user input signals are inputted using a telephone. Another preferred embodiment replaces the telephone with a microphone coupled to the set-top box, and more preferably with a microphone that is built into a remote-control unit which is in communication with the set top box. Such embodiment is better constructed if it is made capable of using the remote control keys as an input device.

In one preferred embodiment the television messaging server is coupled to an IP based network for receiving messages and user input therethrough. The television messaging gateway may be integral to the messaging server, or located remotely therefrom, for example on a separate computer, Integrated within the set-top box, or a combination thereof.

Alternatively, the television messaging gateway further comprises storage means to store a plurality of the messages and the addressing information associated therewith. Such storage device would also utilize a database to correlate the addressing information with a specific user and addressable terminal. Additional alternative includes the capability to use the user input signals to identify and select an addressable terminal to direct messages to.

Alternatively, the television messaging gateway also comprises receiver means to receive user generated messages for directing those messaging to other users within the system or outside it.

The messages are of a type selected from audio messages, video messages, fax massages, text messages, multi-media messages, and e-mail messages, or any other message directed to a user or a group of users. Examples of the downstream network include a cable television network, a satellite television network, a terrestrial video distribution network, a radio frequency video distribution network, a cellular network, a hybrid network, telephony network, or a combination thereof capable of delivering the message data to be ultimately displayed on a television set, or for utilizing the television speaker as an output device.

Similarly, examples of the user input signals include, but are not limited to, telephony input, touch tone signals input, voice input, remote control device input, remote control microphone input, set-top box microphone input, pointing device input, and keyboard input, or any similar device designed to allow interaction between the user and the television messaging gateway. Similar to the downstream network, the important characteristic requirement of the upstream network is the capability to transmit the user input signals and other communication from the user to devices on the network such as the TV messaging gateway, or a messaging server. The selection of the upstream network is thus a matter of engineering choice, and the network may be selected from a group consisting for example, of telephony network, a bi-directional television distribution network, a wireless network, or a dedicated wire network, or any combination thereof or similar in function, to convey user input signals to the television messaging gateway. An example of an upstream network comprises a bi-directional television distribution network wherein the remote terminal is adapted to send user input signals to the television messaging gateway via the upstream network.

The invention is specially adaptable where the video signals comprise digital video signals and wherein the downstream network is constructed to transmit digital video signals and addressing information to address selected signals to a selected addressable terminal.

The invention also teaches a method within a television broadcasting system for receiving and storing a plurality of messages directed to a particular user, converting the messages to video signals and, selectively transmitting the video signals to a particular television set associated with said particular user for outputting the message therewith. The method may also comprise the steps of receiving user input signals via an upstream network, selecting one or more messages in accordance to the user input signals and, converting the messages into video signals for output by the television set. Furthermore, the method provides for the step of entering user outgoing messages via the upstream network.

In order to facilitate management of said plurality of messages, the invention provides for the steps of generating message management information screens corresponding to the plurality of messages, and displaying those screens on a selected television set associated with said particular user; receiving user input signals to direct a television messaging gateway to select at least one message for display; and, converting the message to audio-visual television signals for outputting by the television set. The steps of converting and/or generating may be preformed by the television messaging gateway physically located remotely to the television set, or by an addressable terminal, physically located in proximity to said television set, for example a set-top box terminal.

It is therefore also an objective of the current invention to couple unified messaging storage to a television messaging gateway, and selectively outputting said messages via said messaging gateway to a television set.

A computer is a preferred device to practicing substantial portions of the methods described above. Additionally, a computer, when properly configured and when executing a program, is a preferred method for implementing the apparatus described above. It is therefore clear that a computer readable media, containing software that when executed by a computer will cause said computer to substantially perform any or all of the methods described herein falls under the scope of the current invention.

BRIEF DESCRIPTION OF THE DRAWINGS

The present invention will be further understood and appreciated from the following detailed description taken in conjunction with the drawings in which.

DETAILED DESCRIPTION OF THE INVENTION

Figure 1:
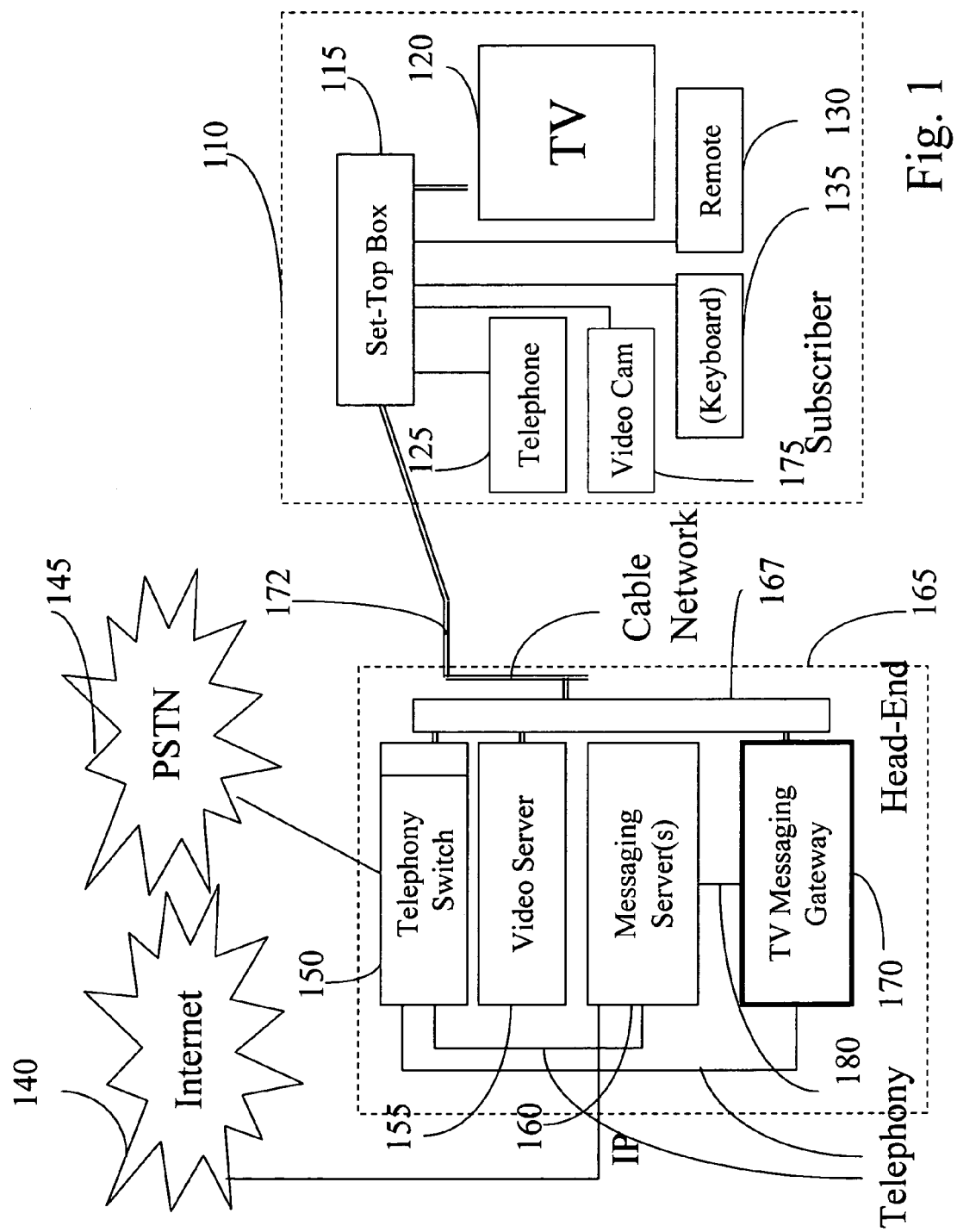
FIG. 1 is a schematic diagram of one embodiment of the invention where the invention is used over a cable-TV network that also provides switched telephony service.

The present invention relates to a method and apparatus for remote viewing of selected messages on a subscriber's television set at a subscriber remote receiving location. The messages can be received from any message store and management system, including voice-mail, e-mail, fax or any other messaging server. The messages can be broadcast over any type of downstream network, such as cable-TV or satellite broadcasting systems (DBS) or xDSL, or any other network that is capable of carrying analog or digital video signals to be processed and displayed by a television or similar display device. The present invention combines the graphical power of the TV screen for the purpose of displaying a list of all message types on the TV, and provides means for the user to select a message. A selected message or messages can be displayed on the TV screen, played using the TV speaker, or converted into speech, whichever is appropriate for the type of message. The system also provides means for the user of the system to send a message back to the sender of the message, using the same means of communication. For example, replying to an e-mail message using e-mail. The system also provides means for sending messages to other users without the need to use a keyboard.

The present invention is particularly suitable for use with unified messaging systems of all types. The power and usefulness of such systems depends upon the easy and user-friendly access that these systems allow for the subscriber or mailbox owner. The example given is of a cable-TV network operator (or MSO) that also provides telephony services. The invention acts as a bridge (or gateway) between any store and forward messaging system, such as telephony, data network, Internet, or cable TV distribution network, and a subscriber TV set, and utilizes the graphical and audio-visual capabilities of the television set together with the interactive capabilities of the telephone or other methods combining voice and key input, such as a remote control equipped with a microphone, or a cellular telephone.

The apparatus further includes an input device for inputting subscriber commands to the television messaging gateway. The input device can be a telephone key-pad, or a microphone (with or without speech recognition apparatus), a remote control unit, a keyboard or a mouse (if available), or any other similar device commonly used for receiving input from a user and convert that input into an electronic form. The user selects a message for playback, and can also provide instructions for message handling, such as delete the message, save it, forward, reply, move into folders, and add voice or textual attachment.

The display can also include, merged into a single list, e-mail, voice, fax, and video messages for the user. It should be noted that the present invention could be used with any combination of these media, for example voice-only (voice-mail), or fax-only (fax server or fax mail).

This invention is operative with any television or video (either digital or analog) broadcasting network, including, but not limited to, cable-TV systems or networks, satellite, hotel closed-circuit TV systems, terrestrial, wireless, cellular, xDSL, LMDS, MMDS and others. The TV broadcasting network communicates with a set-top box associated with a subscriber's television set. For purposes of the present invention, the term set-top box, interchangeably referred to as addressable terminal, includes any external, internal, or other television controller or tuner for downstream or upstream feed. The set-top box need not be a separate box, but may be an integral part of some television models. According to one embodiment of the invention, the set-top box is has a last-screen-display feature, which means that it would continue to display the last frame it received until another frame refreshes the display. Alternatively, the television messaging gateway logic may be fully or partially implemented within the set-top box. In one preferred embodiment, the set-top box includes logic such as a CPU and memory that is capable of executing software, and thus capable of providing wholly or partially the functionality of a TV messaging server.

Referring now to FIG. 1, there is shown a schematic diagram showing a first embodiment for carrying out one aspect of the invention. The environment where the system is used is cable telephony or satellite broadcasting (Direct Broadcasting System or DBS) or a hotel cable system, or any other system or network where a telephone and television are deployed. Television here means a regular TV set, or a high-definition TV set (HDTV) or any other screen equipped device that is used mainly for viewing video transmissions, as opposed to a computer screen that is used mostly for Internet or for other computing tasks and applications.

The apparatus of this embodiment of the invention includes a telephony switch 150, a messaging server 160, and one or more video servers 155. All are typically located at the premises of the network operator, such as the cable head-end or main office. The term "video server" represents any source of video programming, such as a video-tape player, or any other means used at the head-end for reproducing video programs or movies. However, it should be noted that these components need not necessarily be located at the same location, or operated by the same operator, and different companies or operators can own these components, as long as they are connected using the present invention as described herein. References to "messaging server" in this application mean any store-and-forward server, such as voice-mail server, e-mail server, e-mail server that is equipped with multi-media, a video messaging server, a fax server, or a unified messaging server. The telephony switch 150 is connected to the cable network for delivering the calls to the residents' homes, and is further connected to the public telephony network 145, and optionally, can be connected also to other telephony switches in the cable operator's network (not shown). Telephony switch 150 is also connected to the unified messaging server by means available for this purpose, such as but not limited to T-1 or E-1 or PRI-ISDN lines, or by means of Voice-over-IP or by any other voice transport means. In addition, unified messaging server 160 can optionally, be connected to the Internet 140 by known means available commercially.

When a call arrives for a subscriber, the telephony switch directs the call via the cable network to a telephone located at the subscriber's default location 110. The means for transferring the call to the subscriber's home 110 can be either using the same cables that are used for transmitting video, or using a separate wires, such as hybrid cable networks deployed in the UK, for example. Means to connect the telephony switch 150 to the cable network are available commercially from General Instruments (GI) USA, for example.

If the call was not answered, or the line was busy (depending on the switch and the particular extension preferences and set-up), the switch re-directs the call to a messaging server 160. Other means for re-directing a call are presented in FIG. 18. The messaging server then answers the call and generally records a message or receives a fax.

From the head-end office 165, video (and optionally, voice and fax calls, and IP traffic for telephony and for Internet) is transmitted by means of the cable network, and reaches the subscribers' remote locations. An example of subscriber remote location equipment is block number 110. Typically, each subscriber is equipped with a set-top box (115) of one of various models. The set-top box is connected to a TV 120, to a remote control unit 130, and optionally, can be also connected to a keyboard 135 and to a telephone 125. The set-top box may be connected to a microphone, or the remote control unit itself may be equipped with a microphone capable of sending voice signals to the set-top box. Alternatively, the telephone can be connected to the cable network that is presented in FIG. 1 using other means available commercially. Optionally, a video camera 175 can also be connected to the set-top box to be used for sending short video pictures or video movies to another subscriber using commercially available video mail applications that may be located on the set-top box or located centrally. It should be noted that only some models of digital set-top boxes are capable of having video-mail or a keyboard feature.

When a call arrives to a subscriber remote location, and there is no reply to the call, or the phone line is busy, and the subscriber has requested that the call in either or both of these scenarios will be transferred to a messaging system, such as unified messaging server 160, the call is then re-routed by the switch 150 to the messaging system 160. In a typical scenario, call details are transmitted from the switch 150 to the messaging system 160, indicating at least the called number (the subscriber's home number) and, optionally, additional information such as the caller ID, and the reason for the call re-routing. The messaging server 160 then answers the call using the subscriber's mailbox parameters and out-going-message, and records a voice message, or receives a fax or receives a video message. The messaging system can be also connected to an e-mail server, or be an e-mail server itself, thus optionally, can store the multi-media message as e-mail, or store e-mail separately, or do both. Messaging systems of this kind are available commercially, for example from Comverse Technology, NJ USA. And from MediaGate, Israel.

When the subscriber wishes to retrieve his or her messages, he typically has three choices:

First, he can use a telephone, and dial to the system. In this case, voice messages can be retrieved using the touch-tone keys of the telephone set, as known, faxes can be re-sent to any fax machine by indicating the destination fax machine's phone number, and e-mail messages can be converted to speech or to fax and be read over the phone or sent as fax.

Second, he can use an e-mail client, such as Microsoft Outlook express. In this case, the voice messages are played using the computer speakers, faxes are shown on the PC screen or printed to a printer, and e-mail messages are also shown on the PC screen.

Third, he can use an Internet web browser access, which is similar to the e-mail client, but without the need for e-mail software. Devices for performing all these functions are known and available commercially.

The present invention provides an additional or alternative means for retrieving and controlling messages, and provides this using the subscriber's TV screen as a display device, and the telephone 125 as an input device. Alternatively, remote control unit 130 (with or without a microphone) and/or keyboard 135 can be used as input device.

Figure 10:
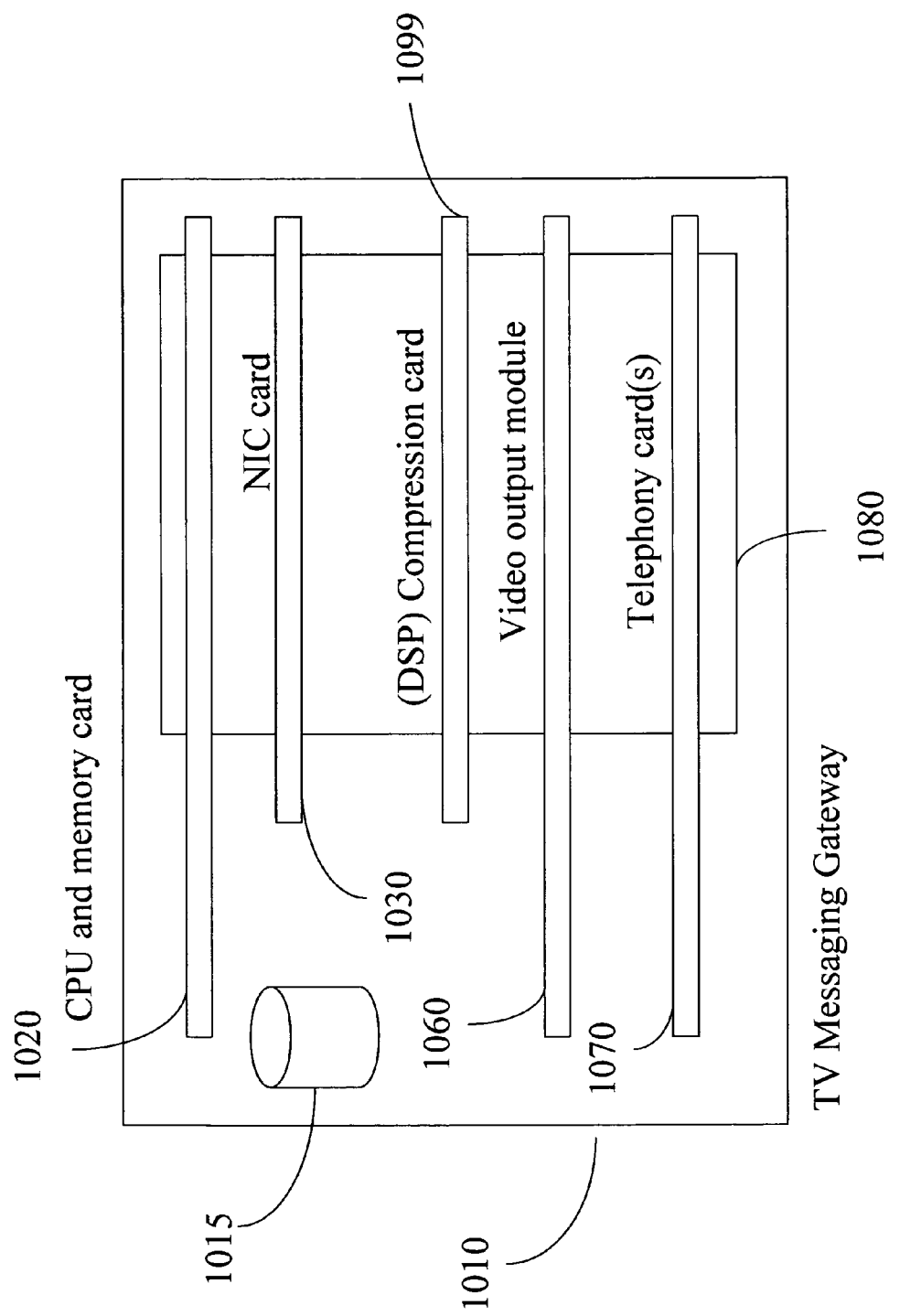
FIG. 10 is a hardware composition of one embodiment of the invention.

TV messaging gateway 170 hardware according to one embodiment of the invention is described in detail in FIG. 10. The gateway can be built using commercial computer hardware. According to one n embodiment of the present invention, the TV messaging gateway is built using industrial PC computer components (available commercially from Texas Micro, USA for example). An enclosure 1010 is housing a passive back-plane 1080. A CPU and memory module 1020, a communication card 1030, such as a NIC (Network Interface Card) are connected to back-plane 1080. An input device interface, here illustrated as telephony card or cards 1070 are used to connect the unit to the input device. Such telephony cards are selected according to the type of the telephony connection required to the switch, and are available commercially, for example, the D300SC card manufactured by Dialogic, NJ USA. In addition, according to another embodiment of the invention, speech recognition accelerator cards, such as the Antares card manufactured by Dialogic NJ USA, or cards from NSC Ltd., Israel, may be used (not shown).

A video output module 1060 is included according to a preferred embodiment of the invention. A video output module comprises one or more video output devices each having a frame memory and/or output video facilities. The video signal can be generated in an analog or a digital format; whichever is suitable for the broadcasting network. Analog modules are available from Matrox USA, or from Imaging Technology, USA. Alternatively, there are real-time digital video compression cards, such as VideoPlex card provided by Optibase, Israel, that can compress video, in real-time, and output it as an MPEG-2 or any other suitable stream that then can be fed into the broadcasting network, through a video multiplexed 167 available from General Instruments (GI), USA, for example. The signals generated by video output module 1060 may be fed into pre-determined channels in the broadcast network. An alternative to a video module may be a server that is capable of generating compressed digital video, such as Oracle's video server system available from Oracle, USA. According to another embodiment of the invention, the addressing information (the set-top box ID) can be sent using known digital means such as DVB standard (Digital Video Broadcasting). It should be noted that the video output module could be of various types, as described, in order to fit to different head-end systems. According to another embodiment of the invention, more than one video output module possibly using different video and/or addressing standards may be attached to a single TV messaging gateway to connect it to more than one head-end.

Figure 11:
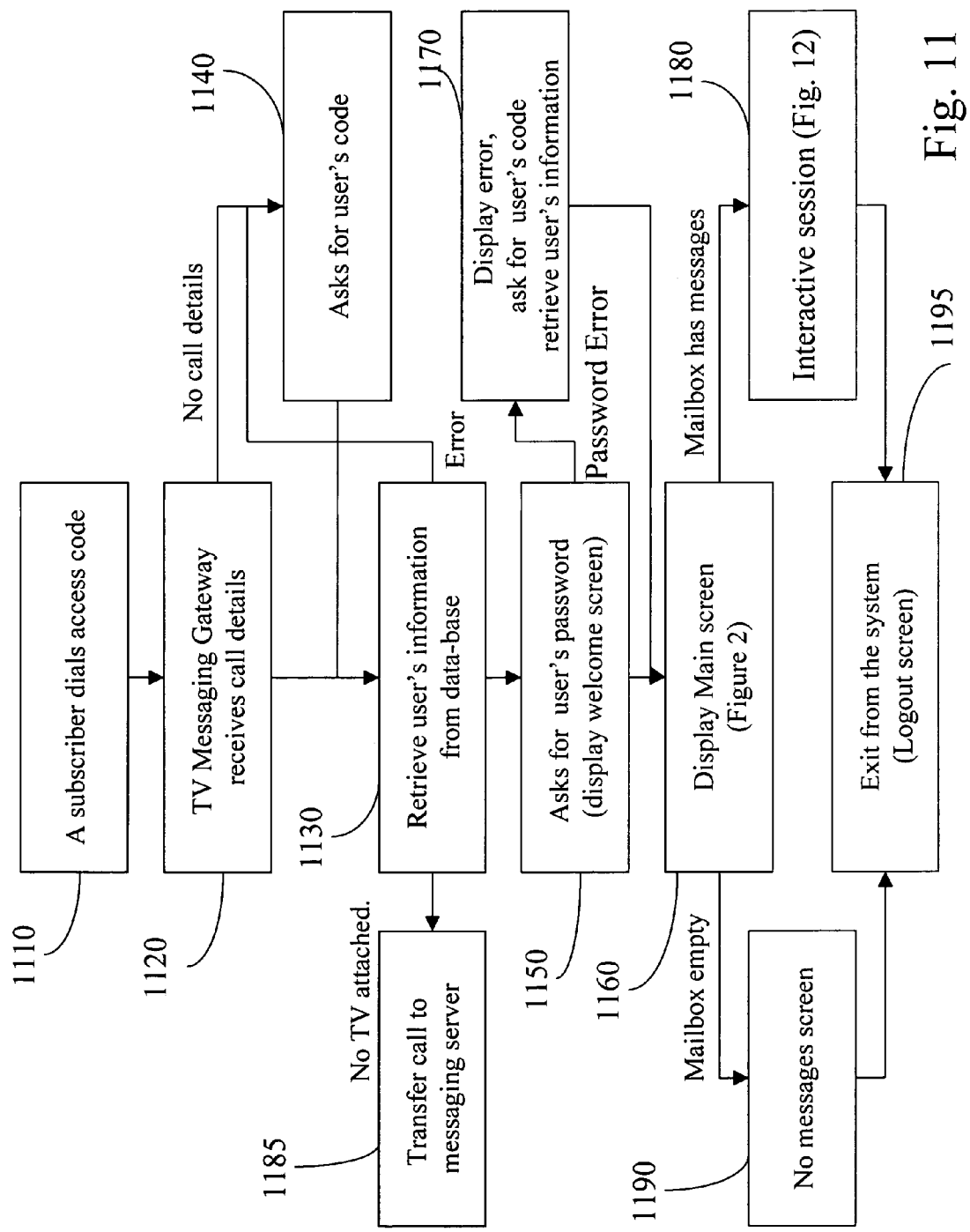
FIG. 11 is a flowchart describing the process that occurs when a subscriber is dialing to the system to retrieve messages according to one embodiment of the invention.

The overall process according to a preferred embodiment of the present invention is described in FIG. 11. At step 1110, typically, a subscriber is using the telephone that is installed at his remote location, and is watching the TV screen. The subscriber tunes the TV (or set-top box) to display the messaging channel which is a known channel number provided the broadcasting network operator. According to one embodiment of the invention, the channel number is common to all subscribers. The user dials an access code, which can be a short or a regular telephone number, which can be also toll-free. By dialing the access code or telephone number, the call is routed by the switch to the TV messaging gateway unit.

At step 1120, the TV messaging gateway answers calls using the telephony card 1070, and preferably receives or retrieves call details that include the subscriber's or the caller's telephone number. At step 1130, the TV messaging gateway accesses a database that may be either local or remote, and using the telephone number retrieved in step 1120 as a key, reads the subscriber's information from the database. This information includes the subscriber's full name, family members, office employees (if the mailbox belongs to an office), preferred language, and encrypted password or PIN. In particular, the subscriber's information record contains the ID of the subscriber's set-top box.

If no record is found in the database matching the retrieved telephone number, the TV messaging gateway concludes that the subscriber is calling from a location other than the default subscriber location, records this fact, and asks the subscriber to manually enter a current telephone number or a user's code (Step 1140).

Following that, step 1130 is repeated once more using the newly supplied telephone number or user's code. In step 1130 there may another situation, where the subscriber is calling the system from a location where there is no TV screen that is capable of displaying the image information that is generated by the TV messaging gateway (for example: that location is not connected to the broadcasting network). In such a case, there is no possibility for the TV messaging gateway to present the user with a TV screen, therefore it is in a situation where the TV messaging gateway has no means for interacting with the user. Recognizing this, at step 1185, the user is transferred to a messaging system adapted to interface with a user via telephony as commonly known in voice mail systems. Alternatively the TV Messaging Gateway may incorporate an additional component to handle telephony only interface in a similar manner to commonly available voice mail systems.

Using the subscriber's information, Step 1150 is executed. The TV messaging gateway generates and sends an addressed screen, in the form of one frame or a short video clip, to the cable network to be broadcasts to the subscriber's set-top box or television. The screen is shown in greater detail in FIG. 2. Using the subscriber's information record, the screen can be generated by the TV messaging gateway using the subscriber's preferred language, and optionally, can contain commercials and other personalized or non-personalized information of pictures or voice. In the screen, the user is asked to key-in his or her password or PIN (personal identification number). This is done using the touch-tone keys of the telephone, and is converted to digits that can be processed by a computer using DTMF detection circuitry that is located on board the telephony card and commercially available. The password entered is encrypted, and the result is compared against the encrypted password that is stored as part of the subscriber's information record. If the password matches, step 1160 is executed. If the passwords do not match, Step 1170 is executed. Alternatively, the user can speak the PIN to a microphone, and speech recognition circuitry or software that is located either at the subscriber premises or at the head-end office, translates the spoken words into input commands.

Another way to verify user access authority is by using speech-recognition software that uses speech comparison technology to compare the spoken password to a password stored in the TV messaging gateway or in the unified messaging system.

The TV messaging gateway reaches step 1170 if there is either an error in the password, or if the subscriber is trying to retrieve from a location that is in the TV messaging server database, but different than the subscriber's default location. For this reason, the TV messaging gateway, at step 1170, displays an error screen, and asks the caller to enter again a telephone number, or user's code, in a process similar to step 1140. This time, the new user's information is retrieved from the database, as in step 1130, however the default set-top ID is not used. Instead, the set-top ID retrieved according to the call details is used, to send the messages not to the subscriber's home, but to the current location of the subscriber instead of to the default subscriber location.

In Step 1160, all the subscriber's details are known. The TV messaging gateway accesses the message store 1015 (typically in the attached messaging server or in the same system on which the TV messaging gateway operates). The access can be done using standard protocols such as IMAP4, POP3, VPIM or any other standard or proprietary message retrieval protocol.

There may be two cases within step 1160: either the mailbox is empty, or there are messages (either new or reviewed). If there are no messages in the box, then step 1190 is executed. Otherwise, step 1180 is executed.

In step 1180, a message list display screen is presented to the subscriber. This screen contains a list of messages and potentially also folders, and the subscriber uses the input device to send commands to the TV messaging gateway. This process is described in greater detail in FIG. 12.

Figure 7:
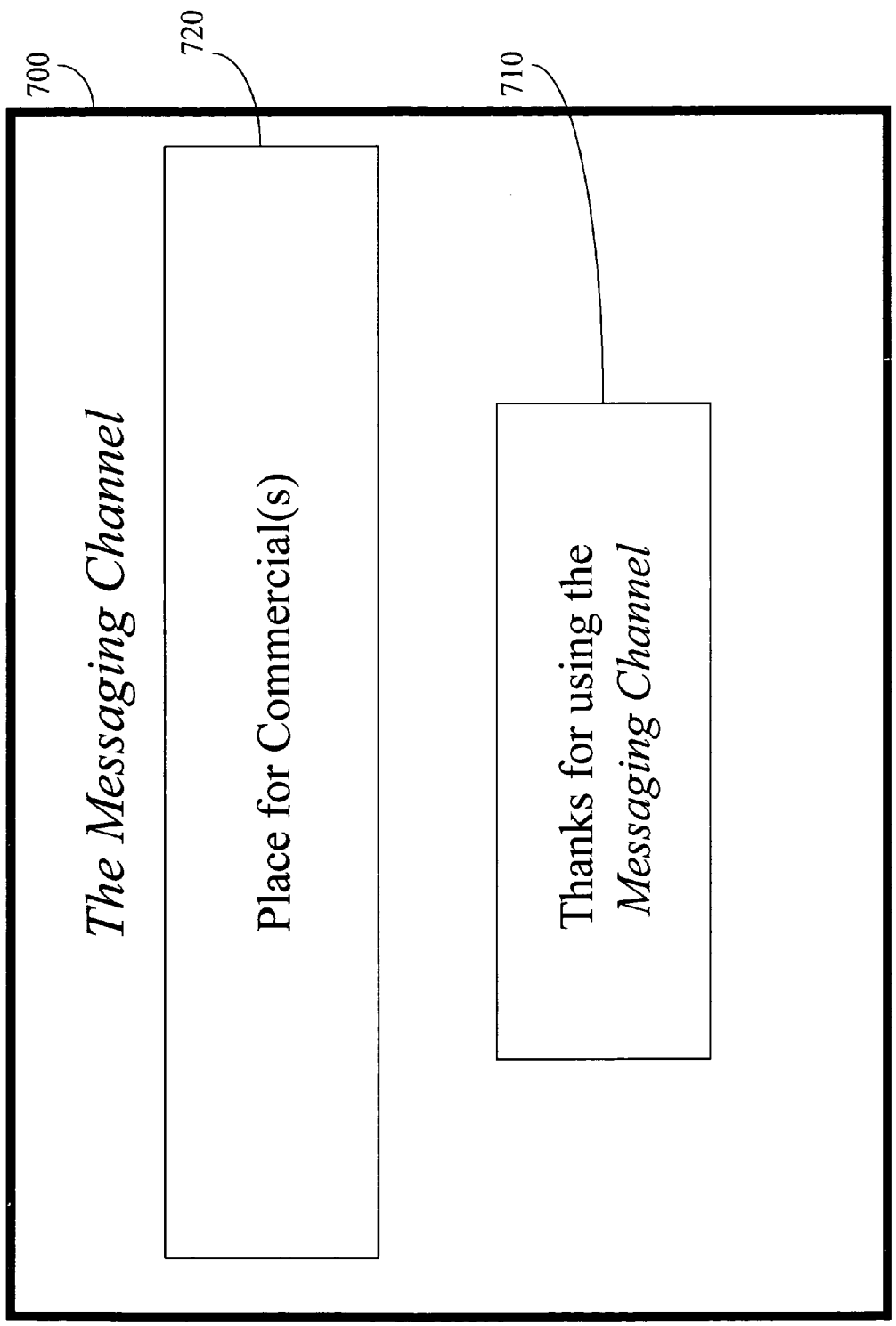
FIG. 7 is an example of a closing screen according to one embodiment of the invention.

In step 1190, which is executed whenever there are no messages in the mailbox, a message is displayed that informs the subscriber (or user) that this is the case. Step 1195 is executed after the subscriber has chosen to exit from the system. This is a good-bye screen. An example of one possible layout of such screen is shown in FIG. 7.

Figure 2:
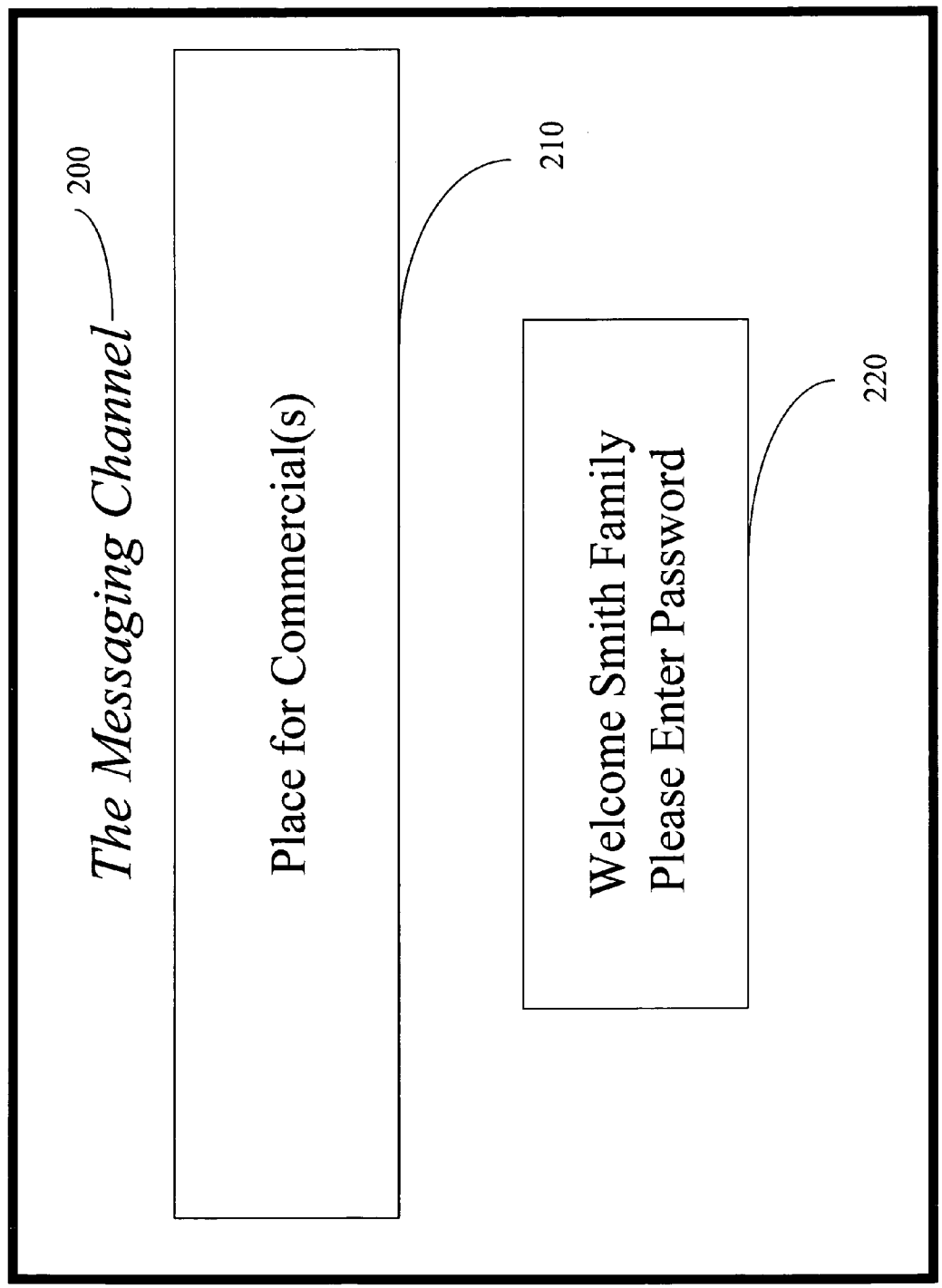
FIG. 2 is an example of a welcome screen according to one embodiment of the invention.

FIG. 2 shows a preferred implementation of a welcome or a login screen that is sent to the subscriber's TV screen by the TV messaging gateway. It contains a header 200 that identifies the commercial name that was chosen for the service, it could also contain a commercial 210, and a personalized welcome message 220. Typically, when a subscriber accesses the system, the subscriber's details (subscriber's information record) are accessed from a database. Some of the fields in this record may, optionally, contain information that can assist in selecting an appropriate commercial advertising out of a commercials database. For example, one may choose to replace commercials by language, or by interest of the subscriber.

Figure 3:
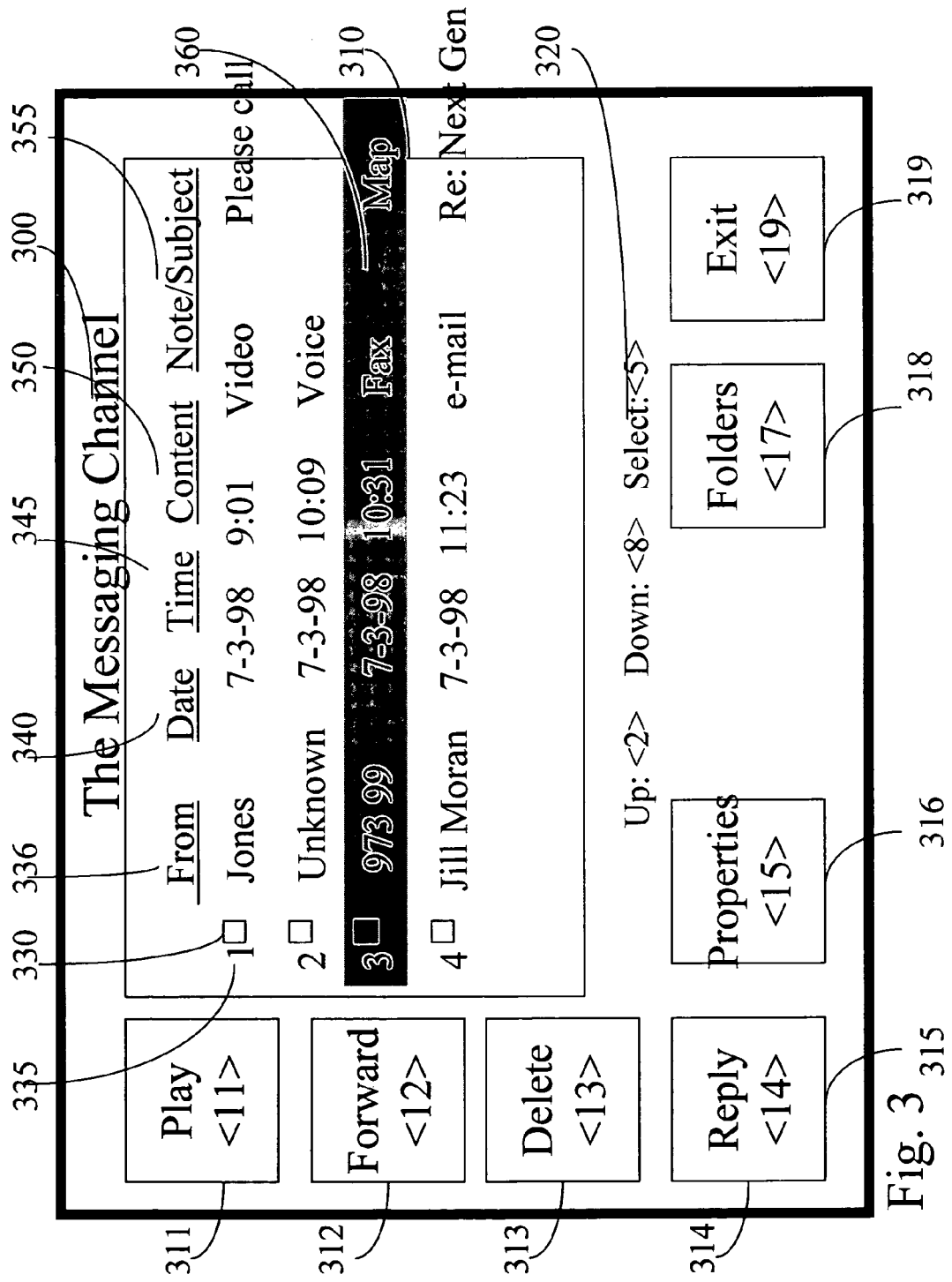
FIG. 3 is an example of a message handling screen according to one embodiment of the invention.

FIG. 3 shows a preferred implementation of the messages screen. The screen contains header 300 that defines the commercial channel name. The main (central) block of the screen is the messages list block where the messages are stored, and is a scrolling window into the messages (310). Around the main block the options that the user can select. The options can be selected, for example, by keying-in the numbers using the telephone, or by pressing the numbers on a remote-control, or by pressing the numbers from a keyboard (if present) or by moving a pointer to the key area using an appropriate remote control unit and a digital set-top box, or by speaking a command word such as "play" to a microphone. Items 311 through 319 are examples of possible options that can be used.

Inside the main block 310 there is a list of messages. The columns are denoted by 336, 340, 345, 350, and 355. The leftmost item in a message line is the message serial number 335 According to another embodiment of the invention, the user can select a message by typing its number using the telephone keypad, or by typing a prefix (like '#') followed by the message number or by saying the message number using the telephone microphone. Next to the message number there is a 'select' indicator 330. If the message is selected, there is a cross or a black filling in this box. Next, the person that sent the message is listed, if known. In case of a fax, the CSID (sending fax ID string) that potentially may be sent by the sending fax machine is indicated. Further to the right, is the date and time when the message was received, and an indication of the content or type of the message (voice, fax, video, e-mail etc.). According to another embodiment of the invention, several types of messages may be combined, such as voice annotated fax (voice and fax together as part of a compound message).

The rightmost field in FIG. 3 central block is the note or the subject field 355. With e-mail there is an attached subject field, and it is displayed here. Some unified messaging systems allow the subscriber to add a similar note to any message regardless of its type, and this field is displayed in the note column, if it was inserted by other means, such as computer access to the messages. In another embodiment of the invention, an attached keyboard that is connected to the set-top box can be used to edit or to create the note field. Yet in another embodiment of the invention, speech recognition technology (such as dictation programs available commercially from Dragon systems, UK, for example) can be used to convert a dictated note into text. In such an embodiment, an additional option should be presented on the TV screen, which when selected, causes an edit subject screen to appear. Examples of 'edit note' screens can be found in many commercially available unified messaging systems, such as "Unity", manufactured and marketed by Active Voice, Seattle, Wash., USA. The subscriber uses the touch-tone keys to move the highlighted line up or down each time he presses designated keys. (In FIG. 3, these keys are "2" for up, and "8" for down. However, any key combination may be used). To select a message, he presses key "5". Alternatively, the subscriber speaks commands, such as 'Line up' or 'page down' and the gateway, using speech recognition, responds to these commands.

Figure 4:
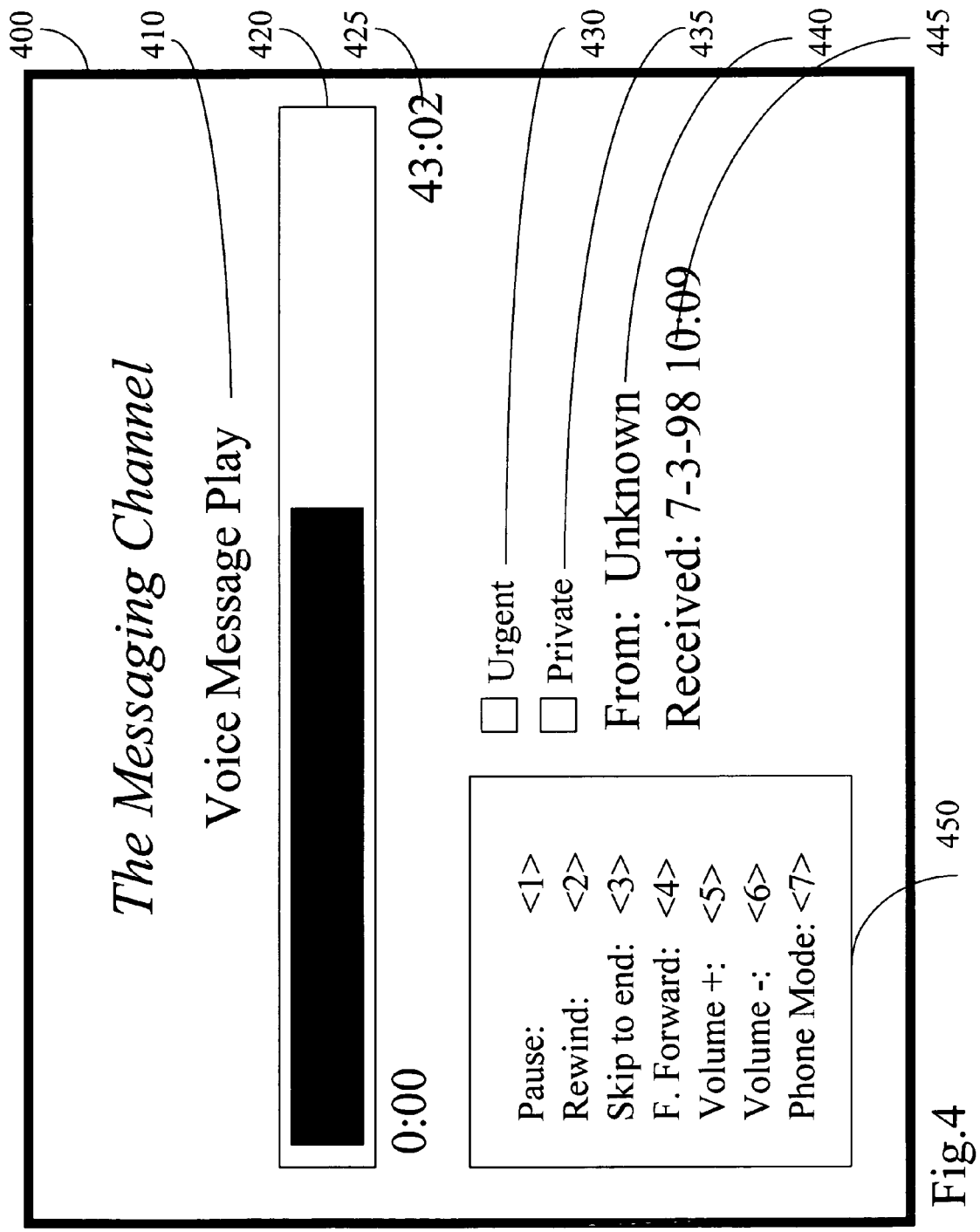
FIG. 4 is an example of a voice message handling screen according to one embodiment of the invention.

FIG. 4 illustrates one example of a screen 400 that is presented when the subscriber selects to play a voice message, according to a preferred embodiment of the invention. The voice can be played using the hand-set or speaker of the telephone, using a remote control unit, coupled to the set top box, and capable of producing sound, or using the TV speaker. The advantages of playing voice using the hand-set of the telephone are greater privacy, and the fact that it consumes less system and network resources that otherwise are needed for compression of the voice and transmitting it via the video channels of the broadcast system. The subscriber can control the mode, for example, by pressing key "7" as shown in block 450. Another component of the play voice screen is the play duration bar 420. This bar shows the play progress of the message. Typically, it is updated once every second or several seconds, depending upon the bandwidth available for the transmission of the screens. At the rightmost side of this bar, the total duration 425 of the message is indicated.

Other components of this screen may be urgent and private message indicators (430 and 435), the "from" field 440 of the message, as explained above, and the date when the message was received 445. There is also a key instruction block 450, that instructs the subscriber which keys to press using his telephone. In the illustrated embodiment, key "1" is used for pause control (pressing it once causes temporary stop in play, pressing it again resumes play from the same point it was paused), key "2" rewinds the message to the beginning, key "3" skips the entire message to the end of it, 4 is fast forward, and "5" and "6" are volume control.

If an input device other than a telephone is used, keys and input commands may vary appropriately, as for example the use and recognition of voice commands where the input device comprises a microphone and the system also contains a voice recognition module.

Figure 5:
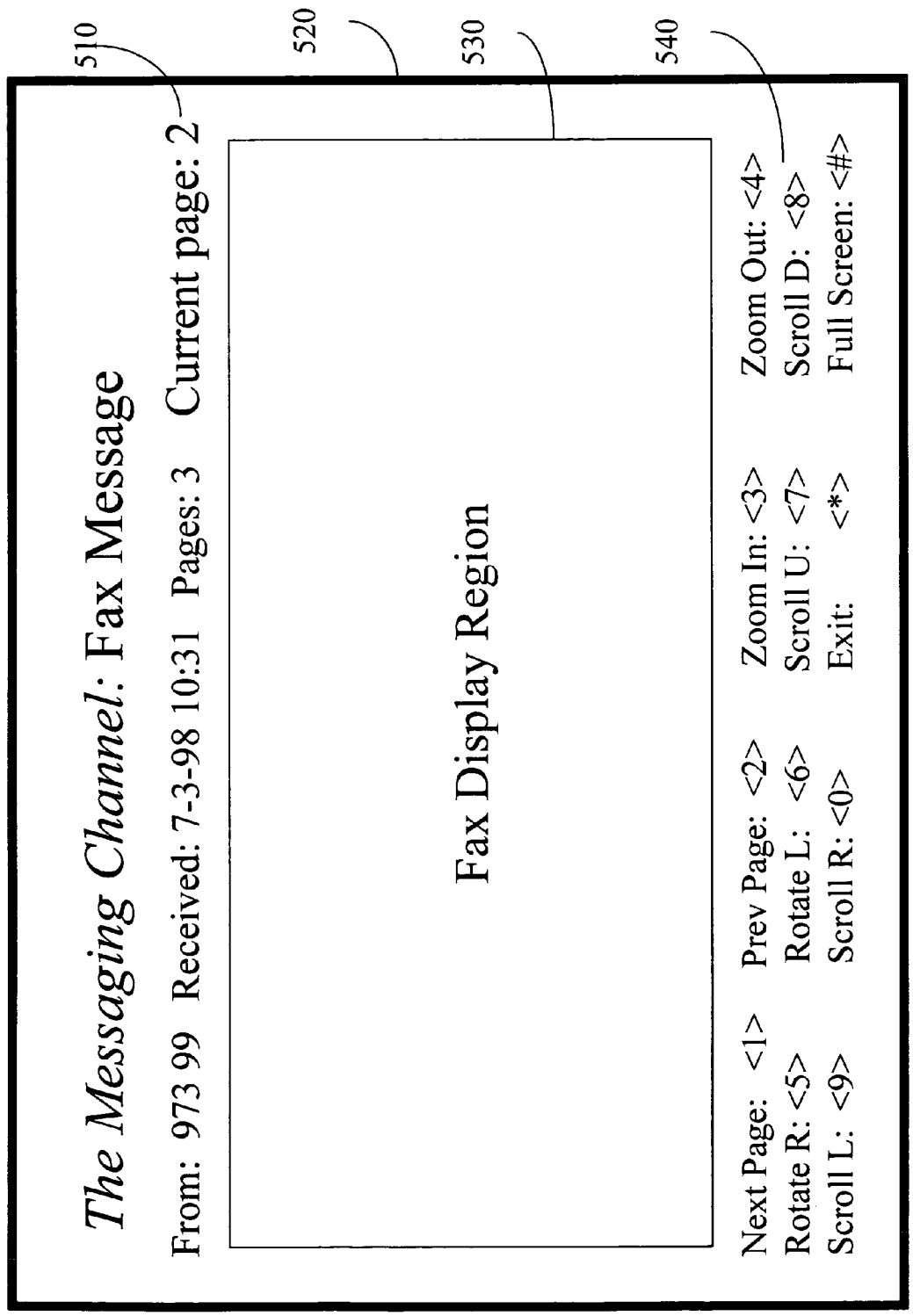
FIG. 5 is an example of a fax handling screen according to one embodiment of the invention.

FIG. 5 is an example of a screen 520 that is presented when a fax message is shown. The central portion of the screen (530) is the region where the fax is displayed. The bottom part 540 is the region where the available options for the keys are presented. Above the central region is a line 510 that shows who sent the fax (if known), when it was received, how many pages it contains, and the number of the current page that is displayed.

One preferred method of presenting the fax on the TV includes converting the graphic information constituting the fax to a bitmap using commercially available software such as Victor image processing library from Catenary Systems, St. Louis, Mo., USA. This bitmap is in a high-resolution, black and white dots, Icorresponding approximately 1720 dots per line, and few thousands lines per page, depending upon the fax resolution and the page length. This high resolution bitmap is converted from a high resolution format to a low resolution format, according to the size of the window 530 on the screen that is dedicated for the fax display. The size of the window is measured also using pixels, or picture elements. This is carried out by any conventional image resizing method, such as bi-linear interpolation. Optionally, if it is desired to improve legibility or sharpen the picture, the data can then be passed through a high-pass filtering algorithm, as known.

Fax is converted into a video format and sent, via the cable network, to the user's television screen. Thus, the fax which is received is not transferred "as is" to the TV screen for viewing, but converted into a video segment which facilitates viewing, editing and other operation the user may perform thereupon using an input device.

Figure 6:
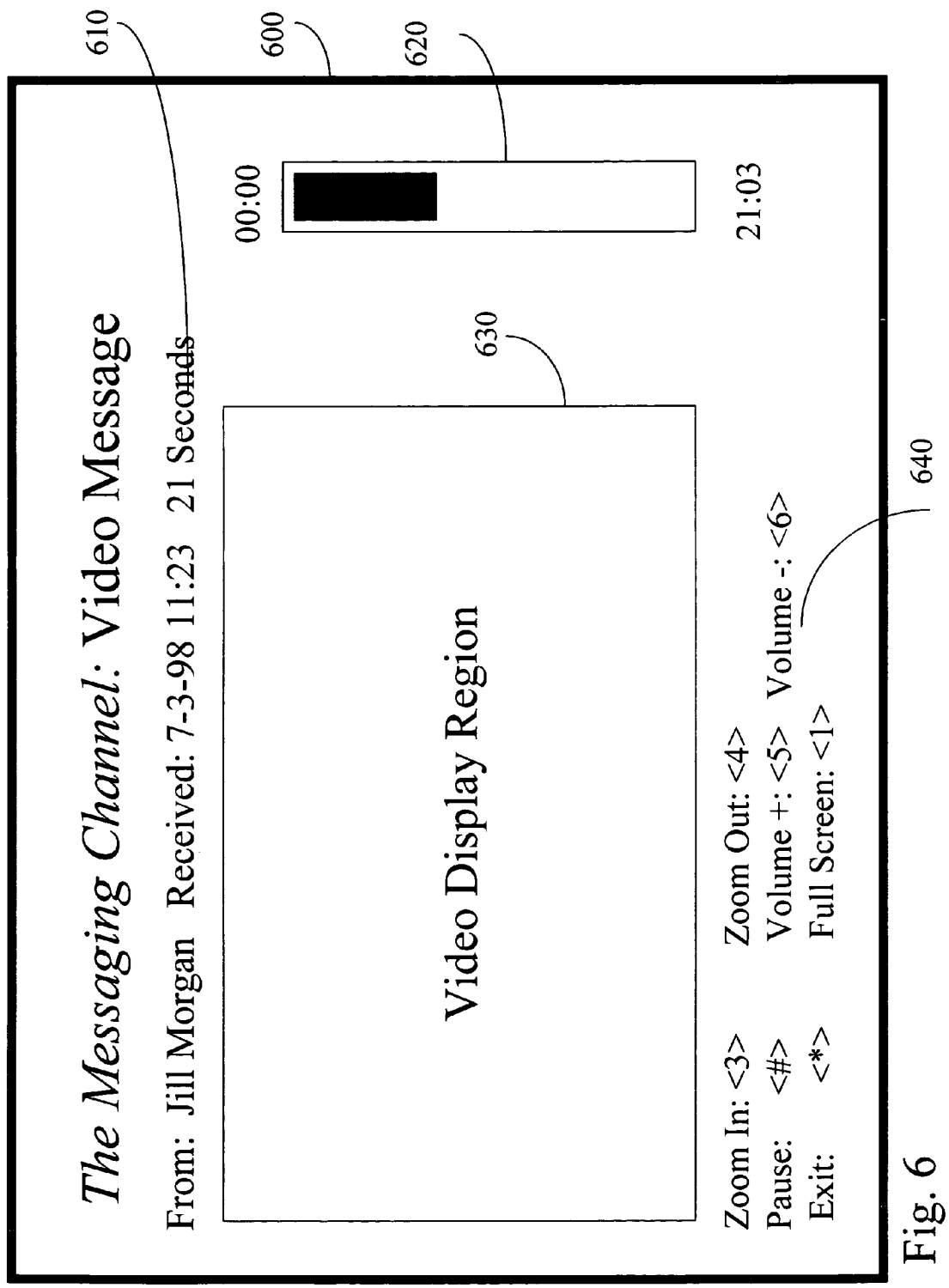
FIG. 6 is an example of a video message handling screen according to one embodiment of the invention.

FIG. 6 is an example of a screen that is displayed when playing back a video message. A video message contains image and voice. It is possible to separate the voice from the image and play the image on the TV screen, and the voice using the telephone handset as explained, or to play the entire video message using the TV facilities. In a preferred embodiment of the invention, the TV is used to play the entire message. A screen 600 is displayed, with a line 610 on the top of the screen indicating details of the sender, date and time received, and length of the message. A video play duration bar 620 is provided to indicate the play progress of the message. The central portion 630 of the screen is the region where the video is displayed. The bottom part 640 is the region where the available options for the keys are presented which can include, for example, zoom in, zoom out, change volume, etc.

FIG. 7 is an example of a closing screen 700 that is displayed when the subscriber has finished and selected the "exit" button. Region 720 is a place for commercials, as explained above. Region 710 is a good-bye message that, optionally, can be personalized for each subscriber by the TV messaging gateway.

Figure 8:
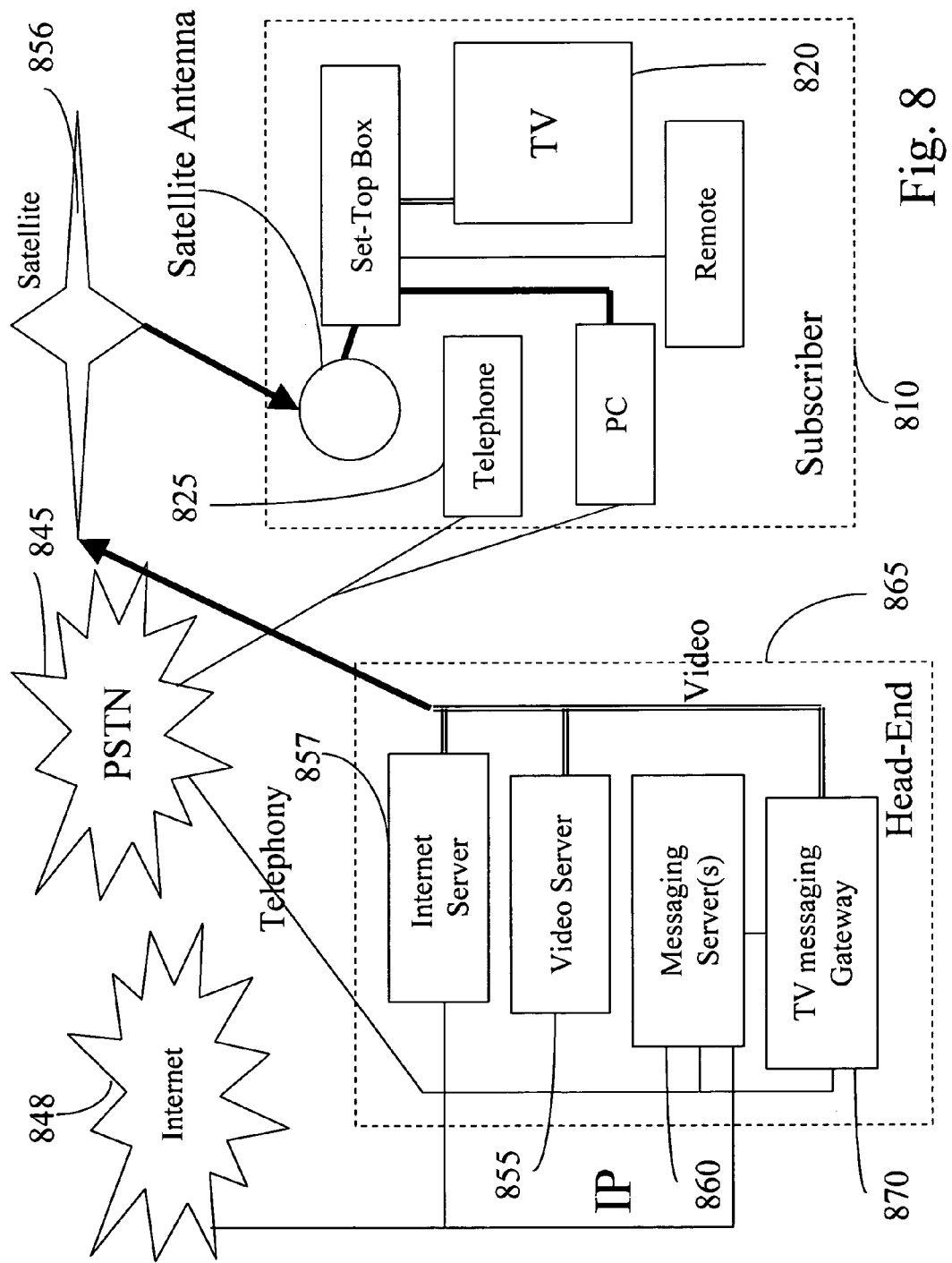
FIG. 8 is a schematic diagram of one embodiment of the invention where the invention is used over a satellite television network together with the public telephone network.

FIG. 8 is another embodiment of the present invention, illustrating the construction and operation of a TV messaging gateway according to the invention in the environment of a combination of PSTN telephony and a satellite TV broadcasting network. According to this embodiment, the satellite 856 is the carrier that delivers TV broadcasts to the subscriber's home 810, and the public telephone network 845 serves as the means to connect the subscriber's telephone 825 to the head-end TV messaging gateway 870.

In the head-end or the main office 865, one or more messaging servers 860 are connected to the TV messaging gateway 870, as described in FIG. 1. The telephone 825 located in the subscriber's home is a PSTN telephone. The subscriber dials a telephone number of the TV messaging gateway 870 and identified himself to the system by means described. The TV messaging gateway then generates and transmits the video screens that are intended for handling messages, as described, to the set-top box or television in the subscriber's home through satellite 856.

The equipment shown in FIG. 8 as being used in the head-end or main office need not physically be located at one location, but can alternatively belong to, and be operated by, different operators, as long they are connected one to each other as shown, or in a similar way in the spirit of the invention.

Figure 9:
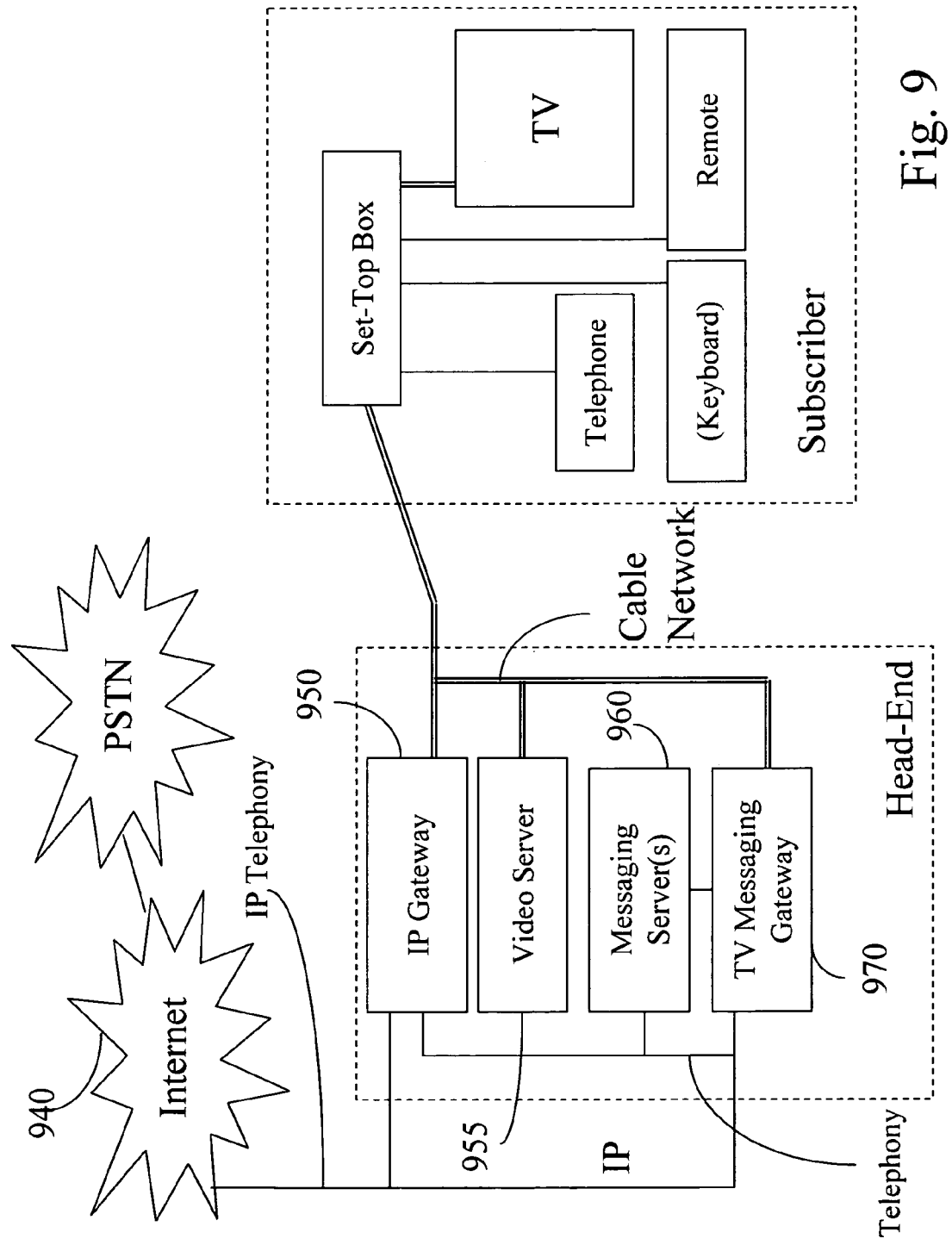
FIG. 9 is a schematic diagram of one embodiment of the invention where the invention is used over a cable-TV network that also provides IP-telephony service.

FIG. 9 is another embodiment of the invention where Internet Protocol (IP) telephony is used together with a cable network system. The overall plan is similar to the one described in FIG. 1, except that the call that arrives to or from the public network (PSTN) is directed using known means to an IP network, such as, but not limited to, the Internet, and from there through IP telephony gateway 950 either to a subscriber, to a messaging server 960, or to the TV messaging gateway 970, depending upon the dialed number and other considerations, as described above. In one embodiment, the TV messaging gateway 970 is built and operated as described with reference to FIG. 10, except that IP telephony cards or IP telephony software are used, instead of conventional telephony cards 1070. This example clearly point out the advantages of another embodiment, where a portion of the TV messaging gateway is located at the subscriber premises, where placing sophisticated and expensive telephony card at every set-top box may not be financially feasible. Thus a centralized module of the TV messaging gateway performs telephony functions, while other functions, for example parsing user input, are performed by a local module at the subscriber premises. An example of suitable IP telephony cards are those manufactured commercially by Audiocodes Ltd., Israel and by Dialogic, USA. An example of IP telephony software is the software available commercially by ElMedia and Lucent, USA, or by RADVision, Israel. It will be appreciated that IP telephony can also be used with other means of broadcasting such as satellite, the same way that was described in regard to FIG. 8.

Figure 12:
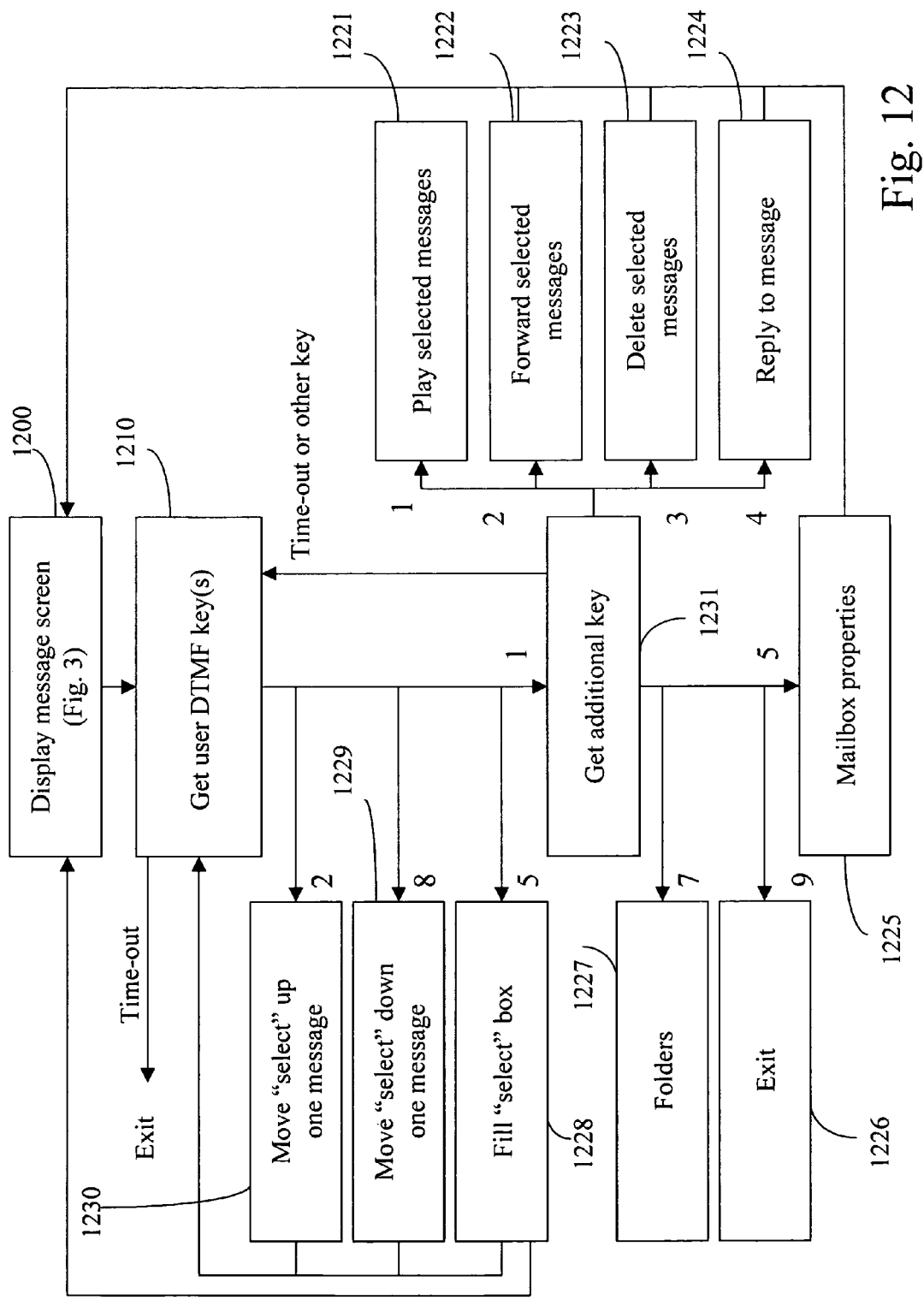
FIG. 12 is a flowchart describing the interaction of the subscriber with the system using a telephone, according to one embodiment of the invention.

FIG. 12 is a flowchart describing the interaction of the subscriber with the system using a telephone, according to one embodiment of the invention. This flow-chart is executed when the subscriber views a TV screen an example of which is described in FIG. 3. This screen is generated at step 1200 and is transmitted to the subscriber's TV screen. The list of messages is acquired from the messaging server or servers attached, using the selected folder (see description for step 1227 below). If no folder was selected the television messaging gateway defaults to a main or an inbox folder. In step 1210 the program waits for the user to use the touch-tone keys of the telephone. The DTMF tones generated by the telephone keys are intercepted by the telephony card 1070 and converted to data processed by the CPU 1020. The flowchart continues to steps 1231, 1230, 1229, and 1228 upon receiving the keys 1,2,8 and 5, respectively. It should be noted that these keys are used here as an example only, and any convenient manner of input may be utilized for accepting user commands as described above. Blocks 1230 and 1229 are the cursor movement controls. In each of these blocks a new screen is generated in which the highlighted line is moved either down one line or up one line. In case there are more lines than the number of lines the screen can display, a vertical scroll operation takes place. In this operation, the location of the highlighted line remains, but the content of the line changes, as the entire list of messages is scrolled either up or down, as the case may be. In block 1228 the "select" mark 330 is filled or cleared. Checking the select key (key 5) first selects the line and selecting it again clears the select mark.

In step 1231 the system waits for an additional key, as all two digit selections in this example begin with '1' followed by another digit. Step 1221, 1222, 1223, 1224, 1225, 1227 and 1229 are executed upon the user presses keys 1,2,3,4,5,7 and 9, respectively. If the user did not pressed a key during a pre-defined time-out period (typically, one or two seconds) control returns back to step 1210.

In step 1221, play message operation takes place. Here a new video screen is generated and transmitted to the subscriber's TV screen. The television messaging gateway generates a different screen, depending upon the message type. Appropriate screen examples have been described in FIGS. 4, 5, and 6.

Step 1222 is used for forwarding a message. Here another video screen is generated, which asks the subscriber to use again the telephone key pad to type-in the number of the subscriber to which the message will be forwarded. Care should be taken not to allow a subscriber to forward a message to another subscriber whom did not allow this transfer. According to one embodiment of this invention, each subscriber's information record holds also a list of other subscribers that he or she can accept the operation of message forwarding from. If the messaging server supports a status of "reviewed" or "saved" for a message, a command is sent to the messaging server from which the message was retrieved, to change the status of the message.

Step 1223 is the delete message. In this step the television messaging gateway sends a delete command to the messaging server at which the message was originally stored, using the ID of the message that was originally retrieved from the messaging server when the list of message was acquired from it. In addition, another video screen is generated, in which the line containing the deleted message is omitted. According to another embodiment of the invention, the message will be marked as "deleted" on the screen (using a different color, for example), and the actual deletion operation from the messaging server will take place only when the subscriber exits from the service. This allows the subscriber to cancel the delete operation if done so before the logout.

Step 1224, if the identity of the party that left the message is known, then a reply operation can take place. In this operation, a new screen is generated, asking the subscriber to either record a voice message as a reply, or if there is a keyboard attached, to type a textual reply. The reply is then either moved to that party's mailbox, if exists on a messaging server attached to the television messaging gateway, or is packed as an attachment or a body of an e-mail and is sent back using e-mail.

Step 1225 is a place for additional screen that allows the subscriber to alter some mailbox properties, such as changing password or PIN, and create or remove folders, if applicable.

Step 1227, a new video screen is generated, in which a list of the folders of the subscriber folders is presented, in a way similar to the display of the list of messages. Here the subscriber scrolls up or down the list, and selects a folder. Upon selecting a folder, control resumes to step 1200, together with a new video display, containing a list of messages, this time the messages are the ones that are in the selected folder.

Step 1226, is the service exit or the logout step. Here a new video display is generated and transmitted to the subscriber's television. Example of such a screen is in FIG. 7.

Operation of the present invention is similar to the description above when using a different input or output mechanism, such as input by remote control unit keys, keypad, or keyboard coupled to the messaging system in any convenient manner. Similarly the screen layout may be modified in accordance with the input or output device. For example, to accommodate key input on a remote control unit, or to instruct the user to use voice commands to a microphone, the screen help sections (450, 540, and 640 for example) may be modified as needed.

It should be noted that since the change rate of the screens for one subscriber operating the system is relatively slow (one screen per 5 or more seconds, typically) there is a considerable conservation of network resources, compared to a movie or a program that is transmitted on a video channel. A frame once every 5 seconds is 125 times slower than a video of 25 frames per second. In addition, the nature of most of the messaging screens presented here is highly compressible which also contributes to saving in network resources. As a result, one messaging channel can serve many concurrent subscribers simultaneously.

Figure 13:
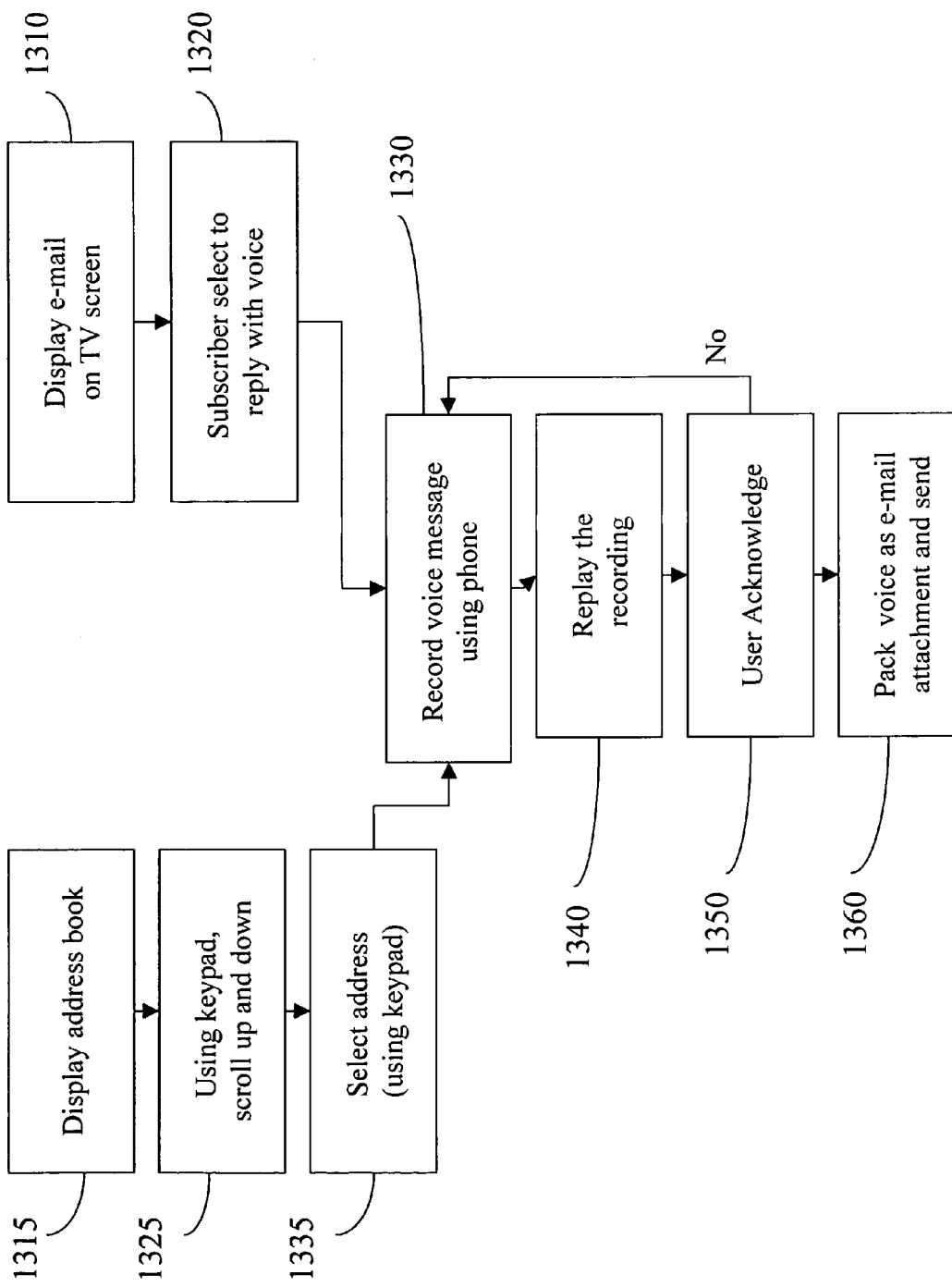
FIG. 13 is a flowchart describing the process of sending or replying to an e-mail message according to one embodiment of the invention.

FIG. 13 is a flow chart showing schematically how a TV messaging gateway of a preferred implementation of the current invention handles e-mail relay or sending e-mail to another e-mail user (world-wide). For an in-coming e-mail message, the TV messaging gateway displays the e-mail on the screen (step 1310), using a screen similar to the fax message display and control. Software for the translation of the textual or the graphical e-mail into a graphical screen is commercially available, e.g. from Imaging Technology Corporation, Boston, Mass. USA. and other companies that offer image processing or rendering software. The graphical screen is converted to analog or digital video signal as described above. After the subscriber has finished reading the e-mail message, he can select (step 1320) to send back a message (a reply). Usually, when someone sends an e-mail message, he expects to receive the reply back as e-mail, as well. However, when the subscriber is viewing the e-mail message using the TV screen, a keyboard may not be available for typing a reply or an e-mail message or for generating an outgoing textual e-mail message. In these circumstances, in step 1330 the subscriber uses a microphone or a handset to record a voice file, using the voice recording capabilities of the TV messaging gateway's telephony card, or similar capability e.g. in the set-top box. In step 1340, the TV messaging gateway plays back the recording file to the user, using the telephone speaker or handset, or, alternatively, using the TV speaker as described earlier. The subscriber can, either acknowledge the recording (step 1350) or re-record the reply message. If the subscriber has acknowledged the recording, then at step 1360, the recording is converted from the condensed format it was recorded with to a format suitable for playback in most computer operating systems (such as a .WAV file format commonly used in Microsoft Windows™ environment) and is added to an outgoing e-mail as an attached file, as known with regard to e-mail messages. Alternatively, speech recognition technology, such as speech dictation software can be used to convert the user's spoken words into text that is then sent as e-mail text message.

In other cases, the subscriber may want to send an outbound e-mail message (as opposed to a reply, where the subscriber first receives an e-mail message). Step 1315, a list of known e-mail recipients is displayed on the screen. The list can be taken from a user's address book that is saved either on the TV messaging gateway or on another system. Step 1325, the subscriber scrolls up and down in the list, using the keypad keys of the telephone keypad, or using speech, in a similar way that was explained earlier for electing a message out of the list of messages. To select an address, the subscriber presses a key (<5>, for example). To send e-mail to all selected addresses, the subscriber is using another key (<6>, for example). Following that, all the other steps 1330 to 1360 are executed as explained above. Another way of selecting the recipient's address may be speech recognition technology that recognizes spoken names. Such software is commercially available from Phonetic systems Ltd, Israel.

Figure 14:
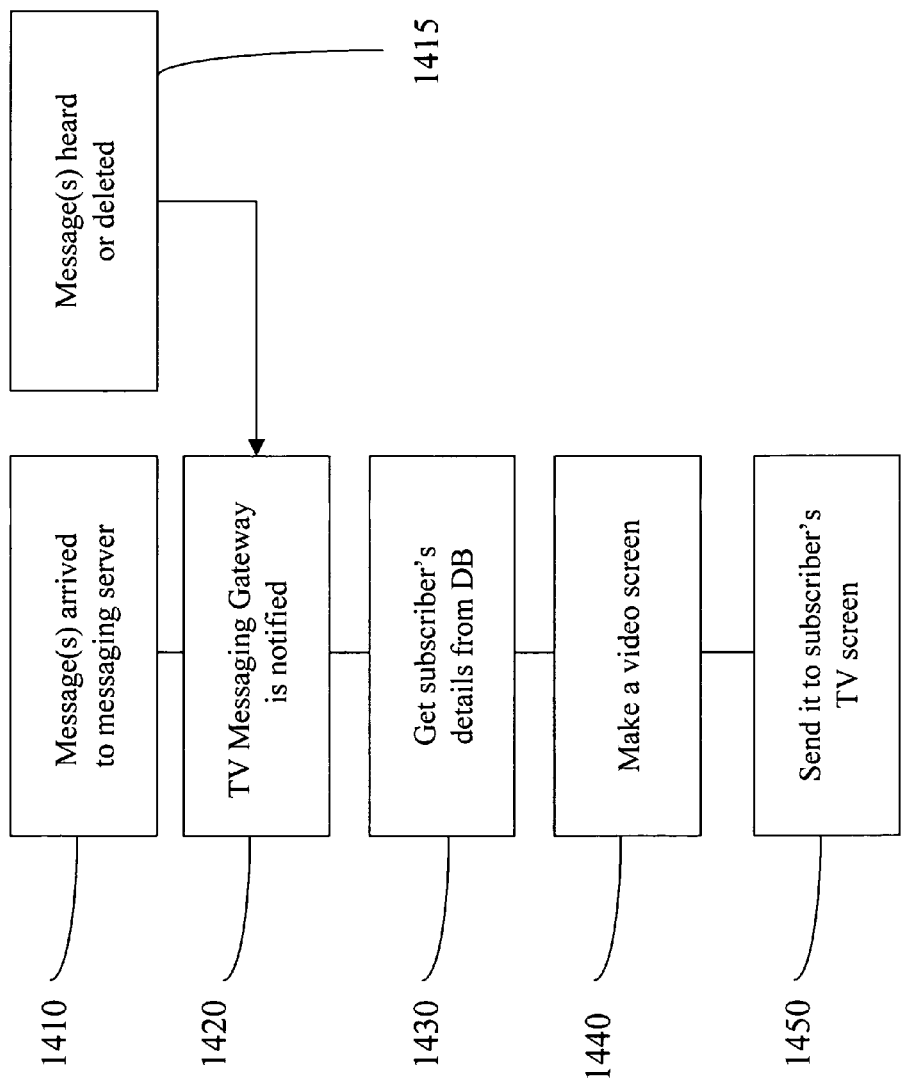
FIG. 14 is a flow chart describing the process of leaving a message waiting notification or indication on top of the television screen at the subscriber's premises.

FIG. 14 is a flow chart describing the process of generating a message-waiting indication at the subscriber's television. Message-waiting indication is an integral part of most messaging systems, and an important feature, since it notifies the subscriber of the existence of messages in his or her mailbox. In step 1410, a message or messages arrive to the mailbox located at the messaging server described above. Step 1420, the TV messaging gateway is notified of the existence of messages. This can be done either by having the TV messaging gateway periodically check the messaging server (polling), using the interface, such as IMAP4, between the messaging server and the TV messaging gateway, or by having a mechanism by which the messaging server notifies the TV messaging gateway whenever a message arrives, or a message is heard (so that the TV messaging gateway can refresh the screen that was previously sent to the subscriber's TV by a new screen, reflecting the new status). In step 1415, when a message was heard or deleted, the TV messaging gateway is notified of the updated messages.

Figure 15:
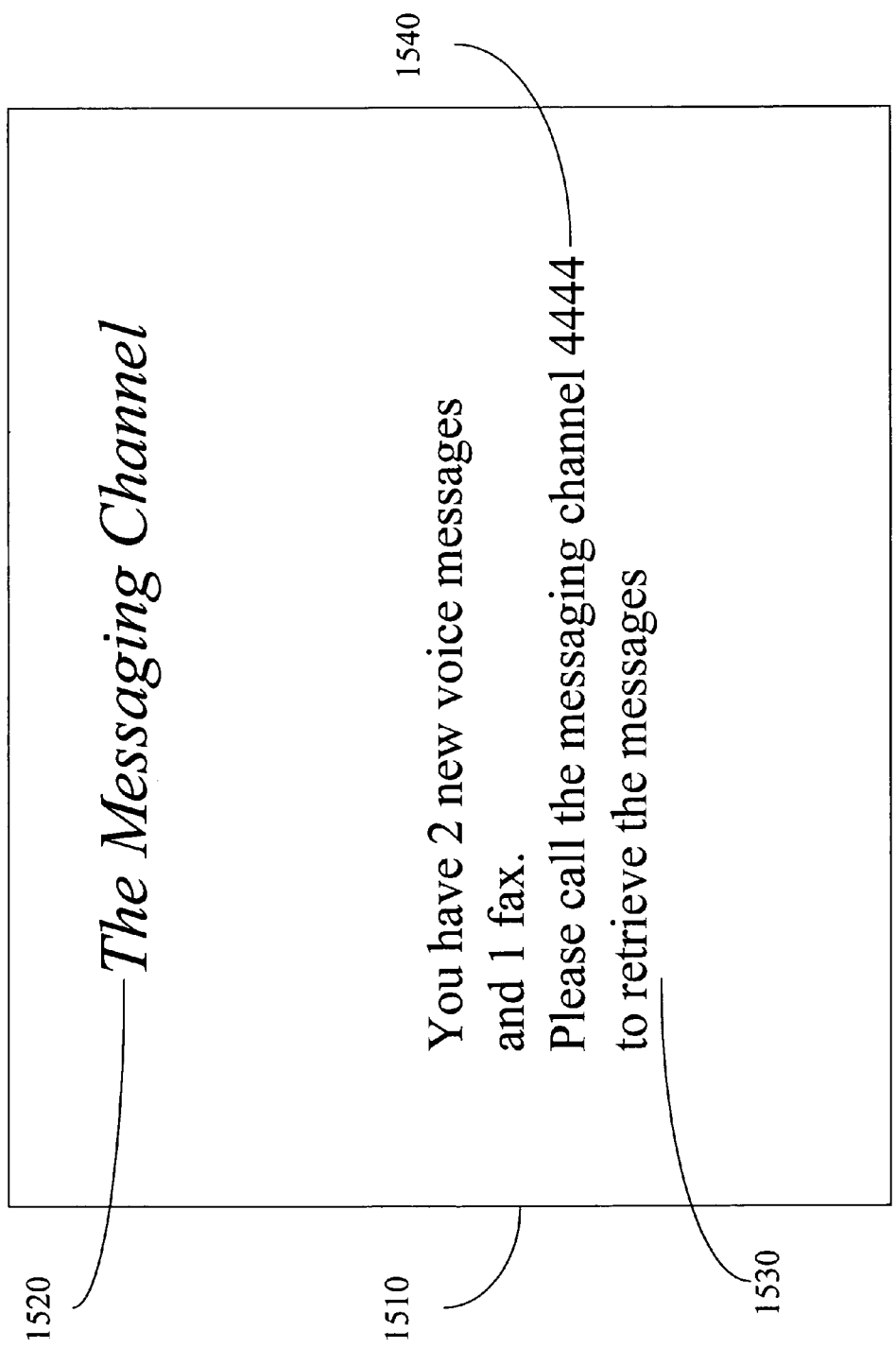
FIG. 15 is an example of a screen sent to the subscriber's television for message waiting indication according to one preferred embodiment of the invention.

In step 1430, the TV messaging gateway retrieves the subscriber's information record from a database. Part of this record are the subscriber's TV screen ID (or set-top ID), and potentially the preferred subscriber's language. The TV messaging gateway synthesizes, in step 1440, a video screen (single frame) or a video transmission (continuous), depending upon the type of the set-top box that is at the subscriber's home (also listed in the database), and addresses it to the subscriber in step 1450. An example of such a screen is shown in FIG. 15. It is a particular feature of the present invention that menus, graphical and textual information, and interactive command keys, are presented on the subscriber's TV in video form, synthesized by the TV messaging gateway, transmitted to the set-top box and then fed as a video to the television screen. Such interactive features and conversion of data into video form are not known or suggested by any conventional methods of presenting messages to a user.

FIG. 15 is an example of a message indication screen 1510 that is sent to the subscriber's home according to a preferred embodiment of the present invention. The screen is generated according to the preferred language of the subscriber. Item 1520 is a header, item 1530 is an example of a body message. The telephone number 1540 is an example of a short telephone number or access code that is assigned according to the local needs of the telephony provider. It will be appreciated that this screen can be personalized by the TV messaging gateway for the specific individual subscriber. The subscriber views this screen each time he or she want to check for messages by changing television channel momentarily to the messaging channel. If there are messages, an appropriate message will be displayed on that channel's screen and the subscriber can then log on to the system to retrieve the message or messages. Alternatively, if the set-top box supports super-imposing of an icon on all channels, then if there is a message, a special small icon can appear on the television display on all channels.

Figure 16:
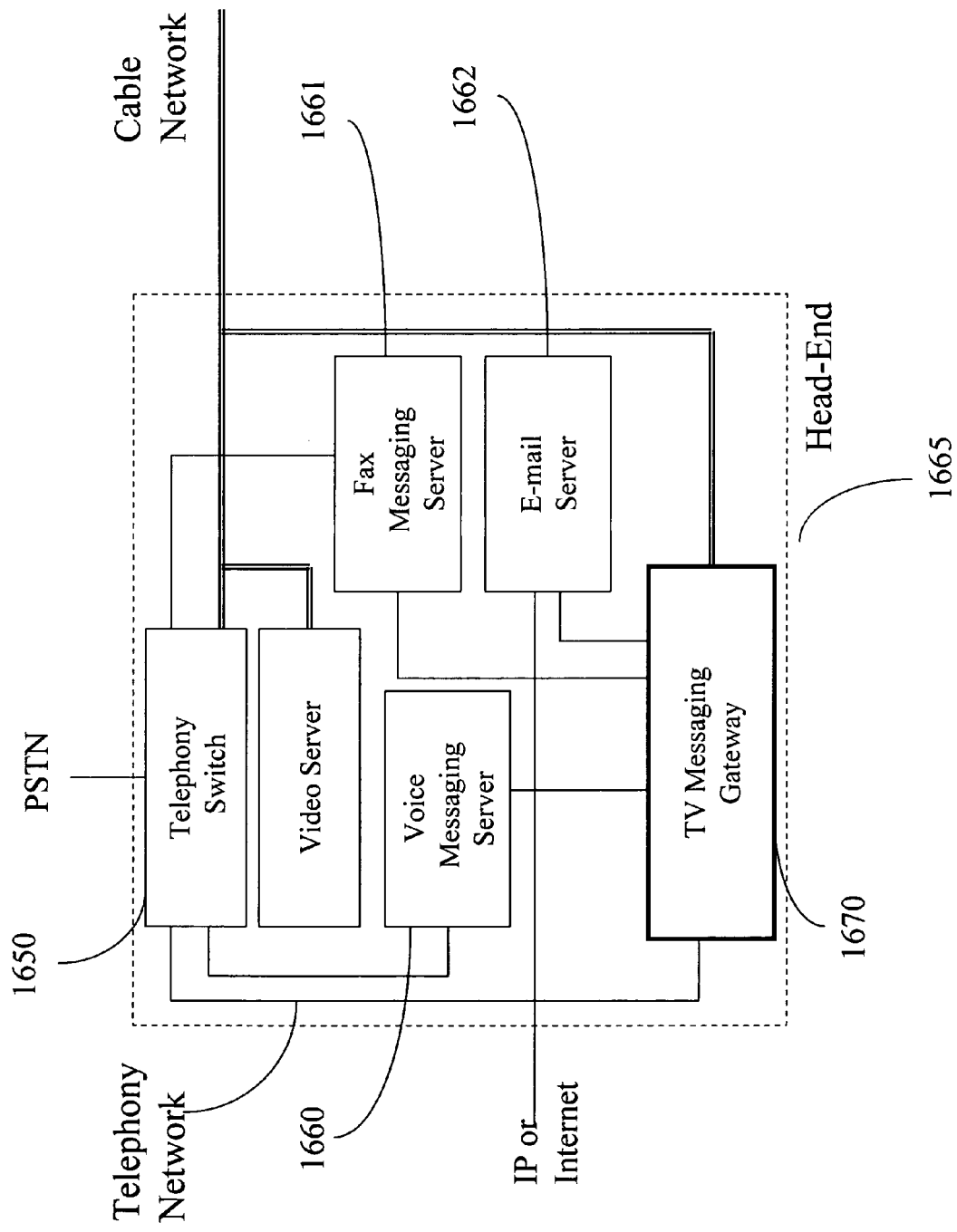
FIG. 16 is a schematic diagram of one embodiment of the invention where the invention is used in a head-end were more than one messaging server is attached to a single TV messaging gateway.

FIG. 16 is a schematic illustration of another embodiment of the invention, where a TV messaging gateway 1670 is connected simultaneously to more than one messaging server, here illustrated as a voice messaging server 1660, a fax messaging server 1661, and an e-mail server 1662. Each messaging server preferably is connected using a messaging protocol such as IMAP4, VPIM, POP3 or a proprietary protocol. In this embodiment, the integration of the different messages into a single list on the TV of the subscriber is done by the software in the TV messaging gateway. Also, whenever the subscriber wishes to listen to a message using the TV interface, the TV messaging gateway is responsible to retrieve the message from the appropriate server. An IP based network that uses a portion of the downstream network as the network medium would allow the TV messaging server to be transparently located in the subscriber premises.

In this embodiment, voice messaging server 1660 (such as Trilogue Infinity, commercially available from Comverse Technologies, NJ and fax messaging server 1661 (such as RightFax, commercially available from AVT Corp., WA, USA), are connected to the telephony network through a telephony switch 1650. E-mail server 1662 is also connected to the Internet.

It will be appreciated that whenever it is stated that the TV messaging gateway is connected to a messaging server, alternatively, the TV messaging gateway can be connected to several messaging servers, each one for a dedicated type of messages, such as illustrated in FIG. 16.

Figure 17:
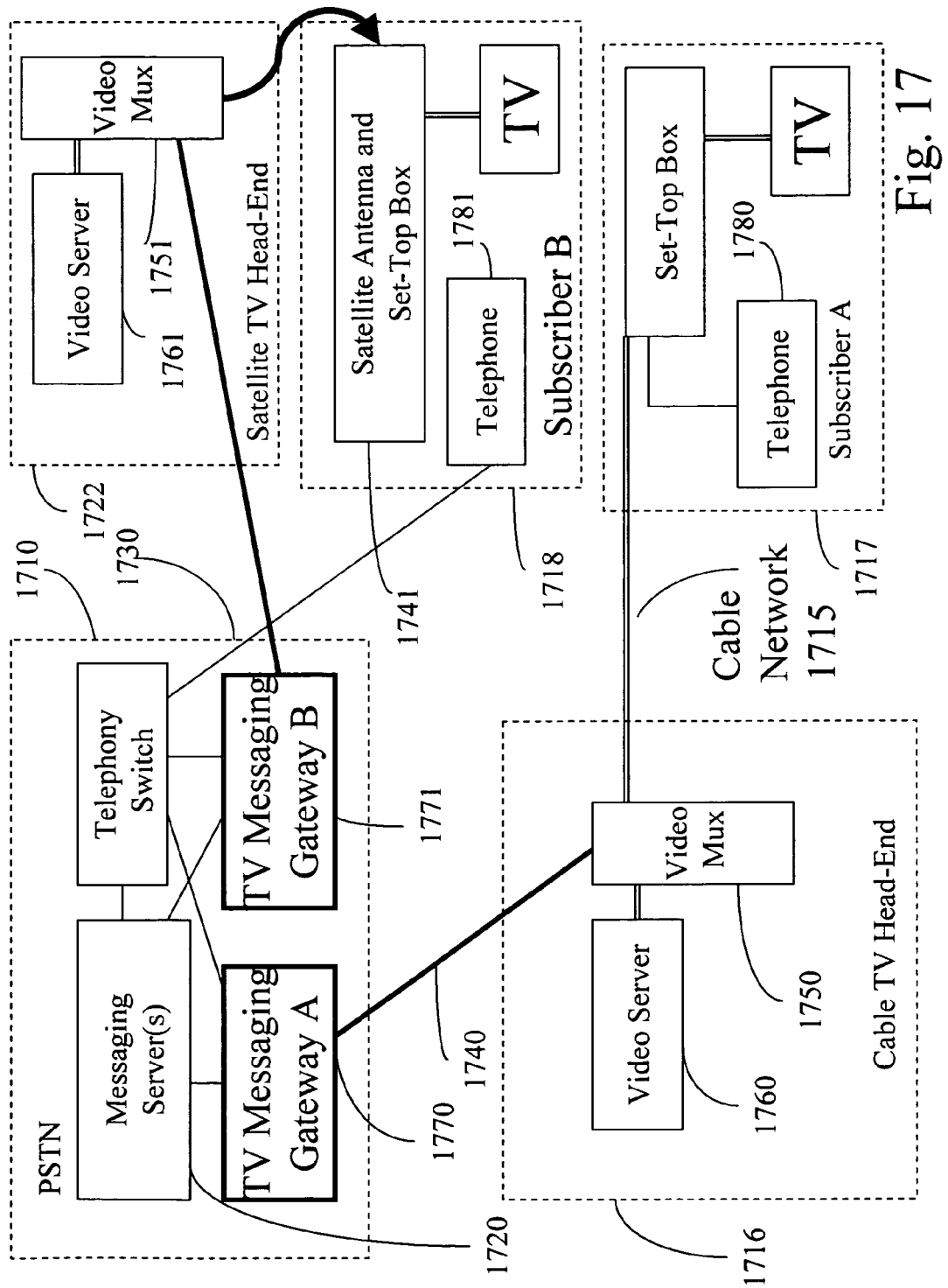
FIG. 17 is a schematic diagram of an embodiment of the invention where a telephony provider (telco) is connected to one or more TV messaging systems connected to one or more television broadcasting systems.

FIG. 17 is a schematic diagram of another embodiment of the invention where the invention is used by a telephony provider (a telco) that have a messaging server attached to more than one TV messaging gateway. Each TV messaging gateway is connected to a different television broadcasting network such as cable network and a satellite network Here the telecom operator operates a messaging service, and wants to allow television subscribers (both cable and satellite subscribers) to have access to their messages using their televisions. In this case, this operator connects two television messaging gateways (1770 and 1771) to a single server 1720 and telephony switch, each television messaging gateway transmits the video to a different broadcast network, denoted as 1722 (a satellite television broadcasting) and 1716 (a cable television network). Each head-end typically broadcasts television to a different population of subscribers (1717 and 1718).

It should be noted that the exact configuration of the head-end systems described in this figure may change, and be similar to the one described in FIGS. 1, 8 and 9 or 17, 18, 19 and 20, yet stay within the spirit of the invention.

Figure 18:
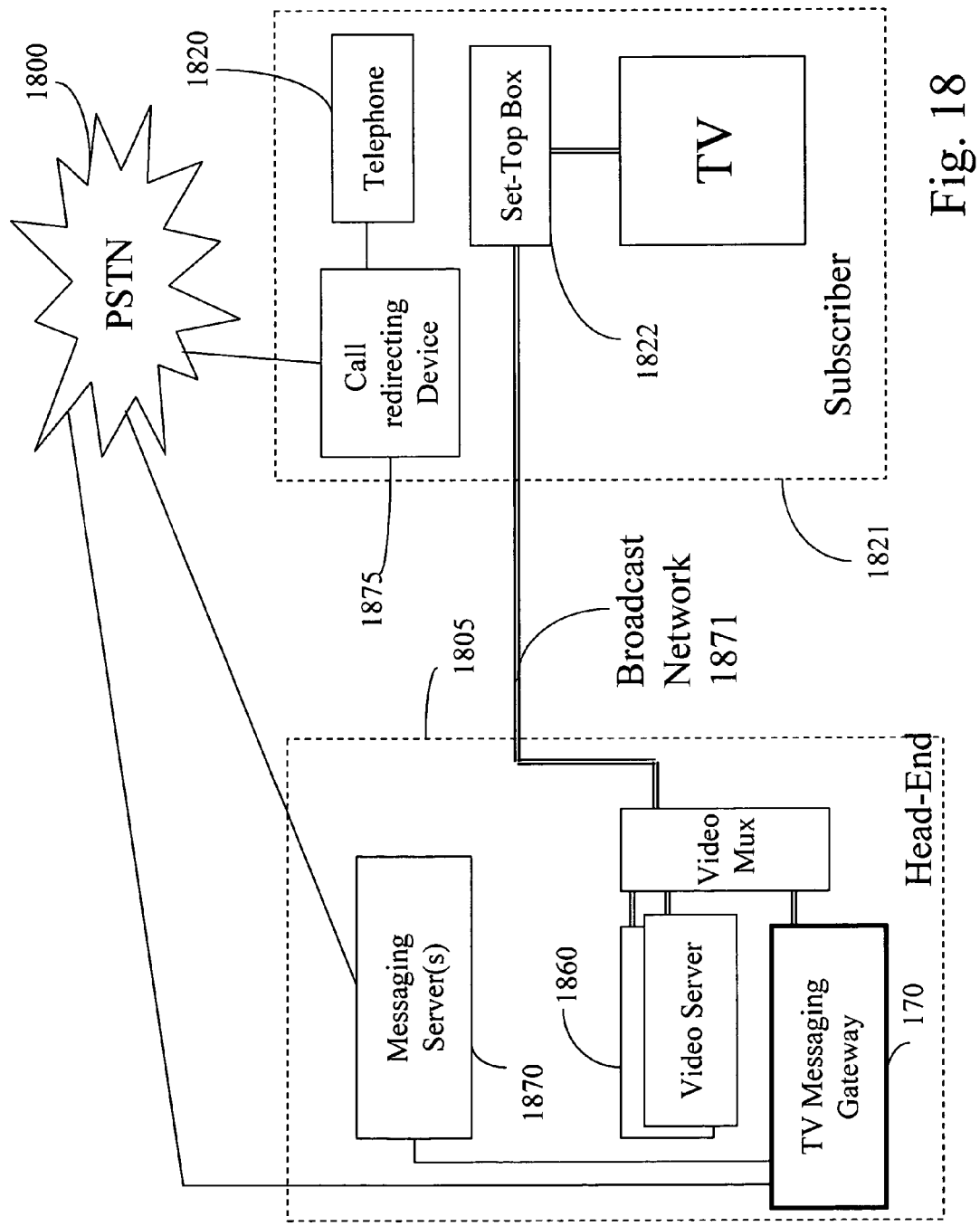
FIG. 18 is a schematic diagram of an embodiment of the invention where telephone messages arrive at the subscriber's telephone from the public switched telephony network and the messages are redirected to a messaging server connected with the television messaging system.

FIG. 18 is a schematic diagram of another configuration of the invention where the telephony services are supplied by an entity separate from the TV broadcasting operator. The subscriber uses means such as call forwarding to re-direct a telephone call to a messaging server connected to a TV messaging gateway. In such a configuration if a call arrives to the subscriber's telephone 1820, and the call was not answered within a specified number of rings, or if the subscriber manually selected to redirect messages, a call redirecting device 1875 located at the user premises or a call redirecting mechanism within the PSTN 1800 reroutes the call to a specific mailbox on messaging server 1870 which is connected the television messaging server 170. The messaging server 1870 than accepts the message for a user associated with the specific mailbox. Alternatively, the messaging server asks the caller to specify a mailbox and directs the message to the specified mailbox. Operation proceeds as described above.

Figure 19:
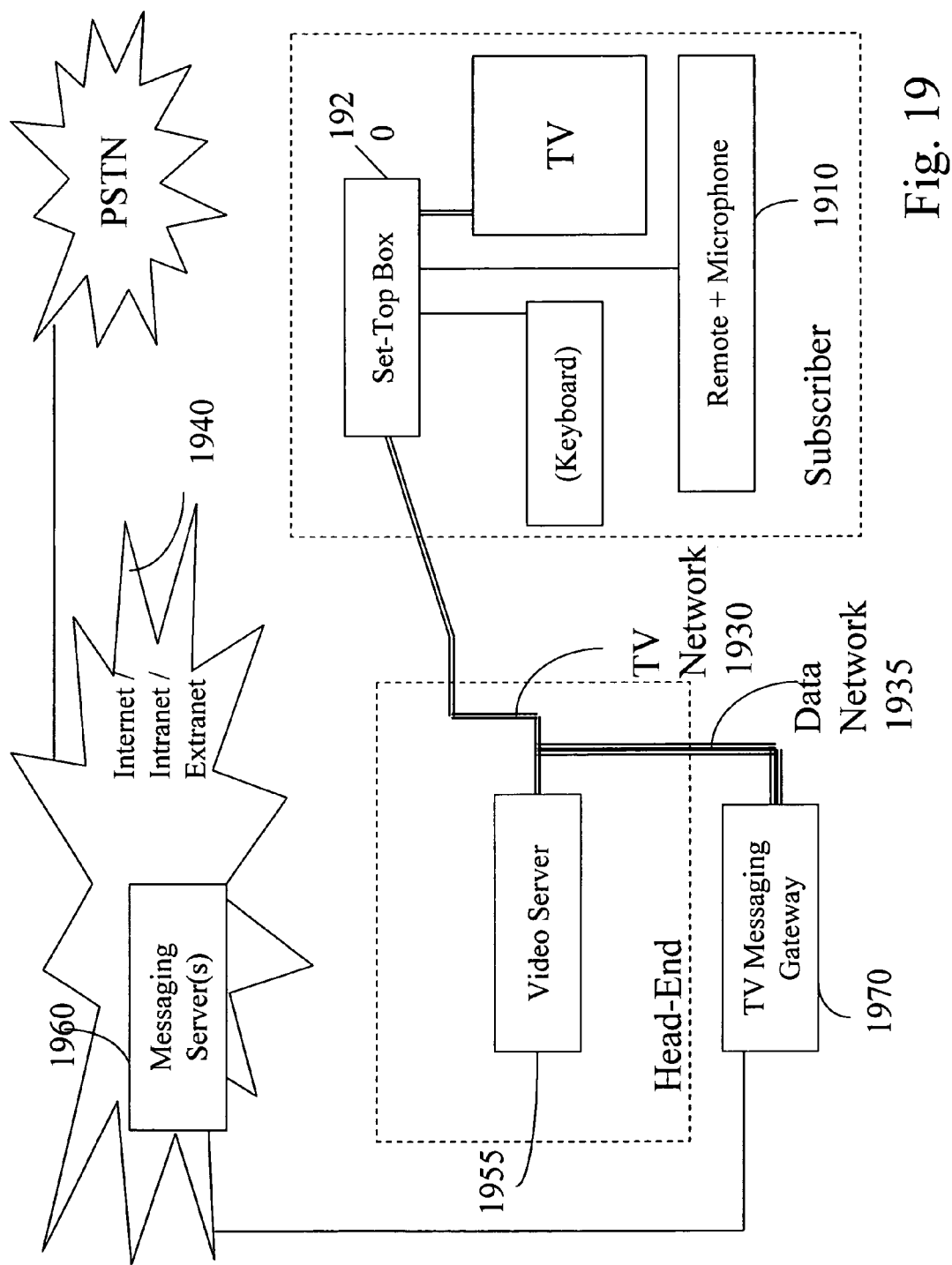
FIG. 19 depicts an embodiment of the invention wherein voice input is provided by a microphone coupled to the set-top box, here illustrated as part of a remote control unit.

FIG. 19 is a schematic diagram of an alternative embodiment of the invention where the voice interface to the subscriber is not a telephone set, but is rather a special TV remote control unit 1910 equipped with a microphone. Such remote control units are available from Interlink Electronics, Cmarillo, Calif. USA.

In this configuration, the subscriber's speech is captured by the microphone and is transmitted to the set-top box e.g. by using an infrared, radio or other wireless link. The set top box 1920 transmits the speech information to the TV messaging gateway 1970, preferably in a compressed format. In the TV Messaging Gateway 1970, the speech information is processed as if captured via a telephone similar to the manner explained earlier, except that the speech information in this case arrives via a data network 1935 that connects the TV Messaging Gateway 1970 to the TV network 1930. If the TV network 1930 is a cable-TV, the TV Messaging Gateway 1970 may be connected directly to the cable network, or, alternatively, to a data network in the head-end, and receive the speech information via this network. If the TV network is of another type, such as xDSL, speech information is also returned on the upstream network path.

It should be noted that while any microphone coupled to the set top box 1920 will perform the required function, a microphone embedded in the remote control unit 1910 offers a distinct advantage: having a single portable control device.

By providing a portable wireless device 1910 that incorporates television remote control, control of the user interface portion of the current invention, and voice input capabilities in a single portable wireless unit, the usability and user friendliness of the invention is significantly enhanced.

TV Messaging Gateway 1970 need not necessarily be located physically at the head-end, but can be optionally positioned in a different location. In such case, there is a need for a suitable data network to connect the two sites, and deliver image and video information between the TV Messaging Gateway and the head-end 1955. In addition, speech information, user selections (remote control and pointer position) and other relevant information from the subscriber's premises, are transmitted via the upstream network and the head-end to the Television Messaging Gateway.

FIG. 19 also shows the TV Messaging Gateway 1970 connected to a network such as the Internet or Intranet 1940. On the network 1940 one or more messaging servers 1960 store messages such as voice-mail, e-mail and/or fax for subscribers in the TV network domain. Some of these servers may optionally be connected to the telephone network (PSTN).

Figure 20:
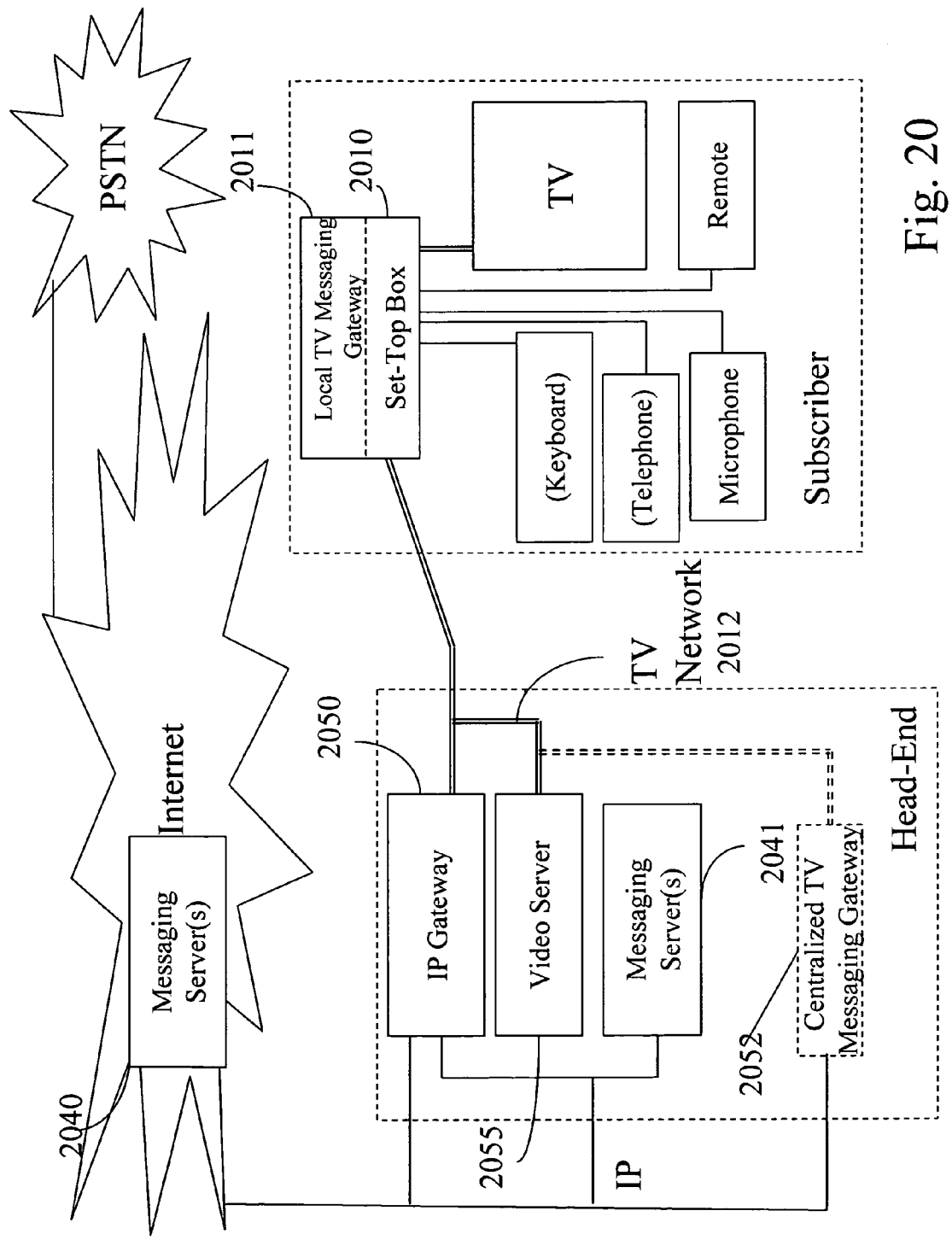
FIG. 20 is a schematic diagram of an alternative implementation of the invention depicting a TV messaging gateway incorporated at least in part in the set-top box.

FIG. 20 is a schematic diagram of another configuration of the invention where part or all of the TV Messaging Gateway logic is implemented using set-top box 2010 resources. A suitable set-top box for this purpose is, for example, General Instruments, Horsham, Pa., USA. set-top box model DCT 5000. This set-top box is equipped with a CPU, memory and external interfaces suitable for implementing and running the TV Messaging Gateway logic and algorithms described throughout this patent application.

The TV Network 2012 supplies the set-top box 2010 with the necessary connectivity to the external networks and servers. Preferably, the set-top box is equipped with a modem, a xDSL modem, or a cable-modem that connects it to the Internet via the TV network or a PSTN. In case of a Satellite TV network, an upstream connection can be supplied either using a telephony (PSTN) modem or an upstream provided by a satellite. In case of terrestrial TV network, the upstream is best supplied using telephony modem. In case of xDSL or Cable network, the upstream is supplied by the TV network itself. As was mentioned before, the selection of the upstream network is a matter of technical and/or financial choice, and the invention may be operated with any data path providing data communications functionality to carry data from the input device to various system components.

In the embodiment of FIG. 20, a separate microphone, connected to the set-top box using either a wire or a wireless connection, is also provided. Clearly such microphone may be implemented in other configurations described in these specification. Optionally, the set-top box may allow for a telephone to be connected thereto and the telephone can be utilized as means of speech input.

In FIG. 20 the entire TV messaging gateway 2011 may be implemented on the set-top box 2010, in which case the operation of the TV messaging system is similar to the methods described above, with the exception of the TV messaging gateway location. Alternatively, the functionality of the TV messaging gateway may be distributed between the centralized TV messaging gateway 2052 and the set-top box Local TV messaging gateway 2011. In that case, a local module operating at the subscriber premises either in the set-top box or in similarly suitable computing device, is in communication with a central module that is executed at the centralized TV messaging system 2052. The functionality may be split between the local and centralized modules, for example so as to have user commands and other spoken words recognized by the set-top box. The spoken commands and words are translated into tokens (in this context tokens are short, predetermined coded strings or numbers, that correspond to longer, standard input sequences such as commands, words or sentences.) that are passed on to the centralized TV Messaging Gateway 2052, that in turn performs all other communications and operations as described. Such an embodiment offers a significant cost advantage, since voice recognition for a single user may be implemented with inexpensive circuitry or by software executing on the set-top box, as opposed to implementation of this function for many subscribers simultaneously at a central location and risking overloading the TV messaging gateway hardware.

Similarly functionality may be split between a centralized and local TV messaging gateway by splitting message storage responsibility. In such a system, if the user wants to store a message for a long period, the message may be stored in a storage device coupled to the local TV messaging gateway, such as a disk drive or flash ROM. Short term messages may be kept on the centralized messaging server. This arrangement offers both increased privacy for the user and maintenance ease for the system operator. Additionally, multiple accounts, or mailboxes, may be handled by the set-top box to allow for example multiple private mail boxes to different family members, and sending memoranda between the shared users of a single set-top box while leaving those messages within the confines of the subscriber premises. Appropriate password protection for the private mail boxes will further contribute to privacy.

Additionally, it may be beneficial to implement some graphical information generation in the set-top box, relieving the centralized TV Messaging Gateway to handle external messaging servers. In such configuration the Local TV Messaging Gateway 2011 has a reception software module that receives messages and attributes, and optionally complete HTML pages, from the centralized gateway 2052. The local TV Messaging Gateway 2011 has a displaying module that is responsible for displaying this information on the subscriber's TV or screen 2014, and an input reception module that allows the user to interact with the system as was previously described. This configuration also offers the benefits of capability to overlap a message display on another TV channel video, and the ability to present a 'message waiting' indication on top of any channel that is currently being viewed.

The local TV messaging gateway may also be implemented as a hardware unit separate from the set-top box, but located in the user premises. Such hardware unit may be either a general purpose computer, or preferably, a dedicated computer, that will display video information on the television screen. As explained earlier with regard to the television messaging system integrated with the set-top box, either the complete TV messaging gateway or a portion thereof may be implemented on such separate hardware unit.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A television messaging gateway for handling messages, said gateway being adapted to operate in conjunction with a television distribution system having a central location connected to a video downstream network constructed to carry video signals and distribute said signals to a plurality of terminals connected thereto, wherein at least one of said terminals is constructed to selectively display said video signal on a television screen, and an upstream network capable of delivering user input signals from a remote location to said central location, wherein said television messaging gateway is adapted for operating in conjunction with a messaging server constructed to store and forward messages and is implemented in part at a central location and in part in a user premises, said television messaging gateway comprising:

a message control interface adapted to couple to said messaging server for controlling at least one message therein, said message having address information associated therewith, to associate said message with at least one user, wherein the messaging server comprises a database for storing and recording a default subscriber location and other subscriber locations, and the messaging server reads the default subscriber location from the database using a telephone number and further requests the subscriber to enter a current telephone number if no record is found in the database;

a video output module for generating video frame signals corresponding to said message or a portion thereof, wherein said module is adapted to couple to the downstream network for outputting said video frame signals on a television coupled to an addressable terminal at the default subscriber location or other subscriber locations;

an input device interface adapted to connect to said upstream network for receiving user input signals inputted using a telephone;

logic for directing said message between said message control interface and said video output module; and, logic for displaying a super-imposed message waiting indication for said message on a television channel being viewed.

2. The television messaging gateway as claim 1 wherein said television messaging gateway further comprises storage means to store a plurality of messages and the addressing information associated therewith.

3. The television messaging gateway of claim 1 wherein said input device interface is further constructed to receive user input signals which are inputted using a telephone keypad, a user voice, or a combination thereof.

4. The television-messaging gateway of claim 1 wherein said messaging server is a unified messaging server, and wherein at least one of selected messages comprises a fax message or a voice mail message.

5. The television messaging gateway of claim 1 further comprising receiver means to receive user generated messages.

6. The television messaging gateway of claim 1, wherein said upstream network is selected from a group comprising a telephony network, a bi-directional television distribution network, a wireless network, a dedicated wire network or a combination thereof.

7. The television messaging gateway of claim 1 wherein said user input signals are selected from a group consisting of telephony input, touch tone signals input, voice input or a combination thereof.

8. The television messaging gateway of claim 1 wherein said upstream network is a bi-directional television distribution network and wherein said terminal is adapted to send said user input signals to said television messaging gateway via said upstream network.

9. The television messaging gateway of claim 1 wherein said input device interface further comprises a speech recognition capability and wherein said user input signals comprise voice signals.

10. The television messaging gateway of claim 1, wherein said terminal is adapted to receive user voice input, and transmit said voice input to said input device interface.

11. The television messaging gateway of claim 1, further adapted to be coupled to an IP based network for receiving messages and user input therethrough.

12. The television messaging gateway of claim 1, wherein said television messaging gateway further comprises a local module and a centralized module, and wherein said local module or a portion thereof is located at the user premises.

13. The television messaging gateway as in claim 1 further constructed to receive user input signals, and to use said signals to identify and select a terminal to direct messages to.

14. The television messaging gateway as in claim 1 further comprising means for notification of receipt of a message.

15. The television messaging gateway of claim 1 wherein said messages are of a type selected from voice mail messages, video mail messages, and fax messages.

16. The television messaging gateway of claim 1 wherein said downstream network is a cable television network, a satellite television network, a terrestrial video distribution network, a radio frequency video distribution network, a DSL network, a cellular network, a hybrid network, direct cable connection, or a combination thereof.

17. The television messaging gateway of claim 1 wherein said video frame signals comprise digital video signals and wherein said downstream network is constructed to transmit digital video signals and addressing information to address selected signals to a selected terminal.

18. The television messaging gateway of claim 1, further comprising a voice recorder to record user voice, and further constructed to embed at least a portion of said recorded voice within an outgoing message.

19. The television messaging gateway, of claim 1 further adapted to generate signals that will cause a progress bar to display on said television screen a progress bar indicating relative progress of an audio or video message being delivered to said terminal.

20. A television messaging gateway for handling messages, said gateway being adapted to operate in conjunction with a television distribution system having a downstream network constructed to carry signals and distribute said signals to a plurality of terminals connected thereto, wherein said television messaging gateway is implemented in part at a central location and in part in a user premises, wherein at least one of said terminals is constructed to selectively display an image corresponding to said signal on a television screen, operating in conjunction with an upstream network constructed to deliver user input signals, and further operating in conjunction with a messaging server, said television messaging gateway comprising:
   an input device interface being adapted to couple to said upstream network for receiving input signals;
   a message control interface responsive to said input signals, for controlling at least one message having address information associated therewith, to associate said message with at least one user, wherein the messaging server comprises a database for storing and recording a default subscriber location and other subscriber locations, and retrieving the default subscriber location from the database using a telephone number, wherein the messaging server further requests the subscriber to enter a current telephone number if no record is found in the database;
   logic for displaying a super-imposed message waiting indication for said message on a television channel being viewed; and,
   an output module, adapted to generating video frame signals corresponding to said message, the module further being adapted to couple to said downstream network, and constructed to deliver said signal to a terminal corresponding to said address information, for display on a television set coupled thereto,
   wherein said signals cause a progress bar on said television screen to display relative progress of an audio or a video message delivered to said terminal;
   wherein said message control interface is constructed to control said message responsive to the user input signals, wherein said user input signals are entered via a telephone.

21. The television-messaging gateway of claim 20 wherein said messaging server is a unified messaging server.

22. The television messaging gateway of claim 21, wherein said upstream network is selected from a group comprising a telephony network, a bi-directional television distribution network, a wireless network, a dedicated wire network or a combination thereof.

23. The television messaging gateway of claim 21, wherein said television messaging gateway further comprises a local module and a centralized module, and wherein said local module or a portion thereof is located at the user premises.

24. The television messaging gateway of claim 21 wherein said upstream network comprises a bi-directional television distribution network and wherein said terminal is adapted to send user input signals to said television messaging gateway via said upstream network.

25. The television messaging gateway of claim 21, further adapted to be coupled to an IP based network for receiving messages and user input therethrough.

26. The television messaging gateway of claim 20 wherein said input device interface further comprises a speech recognition capability and wherein said user input signals comprise voice signals.

27. The television messaging gateway of claim 20, further comprising a voice recorder module to record user voice, and further constructed to embed at least a portion of said recorded voice within an outgoing message.

28. A method for handling messages comprising the steps of:
   using a telephone, inputting commands to a television messaging gateway, to select at least one message directed to a user;
   causing said television messaging gateway to output a in response to said commands to a messaging server, for outputting said message via a television distribution system on a television set associated with said user, wherein said television is coupled directly or indirectly to said messaging gateway, wherein the messaging server comprises a database for storing and recording a default subscriber location and other subscriber locations, for reading the default subscriber location from the database using a telephone number and requesting the subscriber to enter a current telephone number if no record is found in the database;
   wherein said television messaging gateway is implemented in part at a central location and in part in the user premises; and,
   the method further comprising displaying a super-imposed message waiting indication for said message on a television channel being viewed.

29. The method of claim 28 further comprising the steps of:
Recording a voice message;
Automatically packing said voice message into an e-mail message; and,
Sending said e-mail message.

30. The method of claim 29 further comprising the step of inputting said voice message via said telephone.

31. The method according to claim 28, wherein said messaging server is a unified messaging server.

32. A computer readable media containing software that when executed by a computer will cause said computer to substantially perform the method steps performed by the television messaging gateway of claim 28.

33. A system for handling messages adapted to operate in conjunction with a television distribution system having a downstream network constructed to carry signals and selectively distribute said signals to a plurality of terminals connected thereto, wherein at least one of said terminals is constructed to selectively display an image corresponding to said signal on a television screen, operating in conjunction with an upstream network constructed to deliver user input signals to a central location, the system comprising:
a distributed television messaging gateway, having a message control interface for selecting at least one message from a unified messaging server, said message having address information associated therewith, to associate said message with at least one user, wherein the unified messaging server comprises a database for storing and recording a default subscriber location and other subscriber locations, and for reading the default subscriber location from the database using a telephone number and for requesting the subscriber to enter a current telephone number if no record is found in the database,
wherein said message control interface is constructed to select said message responsive to said user input signals entered via a telephone, and said system is adapted to feed a video frame signal corresponding to said message into said downstream network;
wherein said video frame signal is directed to at least one of said terminals, for display on a television set coupled thereto;
wherein said television messaging gateway is implemented in part at a central location and in part in an user premises, and comprises logic for displaying a super-imposed message waiting indication for said message on a television channel being viewed; and,
wherein said signals cause a progress bar on said television screen to display relative progress of an audio or video message delivered to said terminal.

34. The system of claim 33 further comprising a voice recorder to record user voice, and wherein said system is further constructed to embed at least a portion of said recorded voice within an outgoing message.

* * * * *

UNITED STATES PATENT AND TRADEMARK OFFICE
CERTIFICATE OF CORRECTION

PATENT NO. : 7,571,458 B1  Page 1 of 1
APPLICATION NO. : 09/484730
DATED : August 4, 2009
INVENTOR(S) : Eyal Bartfeld It is certified that error appears in the above-identified patent and that said Letters Patent is hereby corrected as shown below:

Title page, item (12): delete "Eyal" and insert --Bartfeld--

Title page, item (75): delete "Bartfeld Eyal" and insert --Eyal Bartfeld--

Claim 28, column 24, line 50: delete "a in" and insert --a message in--

Signed and Sealed this

Twenty-fourth Day of November, 2009

David J. Kappos
*Director of the United States Patent and Trademark Office*